United States Patent
Ide

(10) Patent No.: US 9,579,958 B2
(45) Date of Patent: Feb. 28, 2017

(54) ROOF APPARATUS

(71) Applicant: AISIN SEIKI KABUSHIKI KAISHA, Kariya-shi, Aichi-ken (JP)

(72) Inventor: Yoshitaka Ide, Anjo (JP)

(73) Assignee: Aisin Seiki Kabushiki Kaisha, Kariya-shi, Aichi-ken (JP)

(*) Notice: Subject to any disclaimer, the term of this patent is extended or adjusted under 35 U.S.C. 154(b) by 0 days.

(21) Appl. No.: 14/953,751

(22) Filed: Nov. 30, 2015

(65) Prior Publication Data
US 2016/0152123 A1 Jun. 2, 2016

(30) Foreign Application Priority Data
Dec. 1, 2014 (JP) .................. 2014-243475

(51) Int. Cl.
*B60J 7/057* (2006.01)
*B60J 7/02* (2006.01)
*B60J 7/043* (2006.01)

(52) U.S. Cl.
CPC ............. *B60J 7/0573* (2013.01); *B60J 7/024* (2013.01); *B60J 7/0435* (2013.01)

(58) Field of Classification Search
CPC ......... B60J 7/024; B60J 7/0435; B60J 7/0573
USPC ................. 296/216.02–216.05, 223
See application file for complete search history.

(56) References Cited

U.S. PATENT DOCUMENTS
8,459,730 B2 6/2013 Sawada et al.

FOREIGN PATENT DOCUMENTS
JP 2012-153336 8/2012

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes: a front member and a rear member which are supported by a guide rail in such a way as to be able to move in a longitudinal direction of a vehicle and as to be engaged with a driving shoe driven to move in the longitudinal direction of the vehicle along the guide rail; a first support bracket, a front end portion of which is supported by the guide rail and is connected to the front member, and which supports a movable panel; and a second support bracket, a front end portion of which is supported by the guide rail, a portion of which is connected to the rear member with the portion being positioned closer to a rear of the vehicle than the front end portion, and which movably supports the first support bracket.

6 Claims, 22 Drawing Sheets

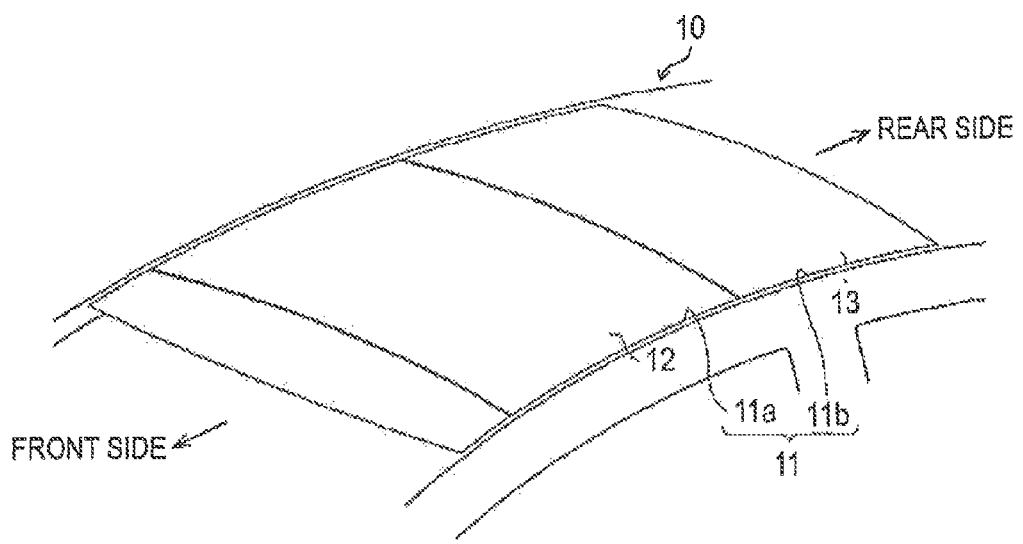
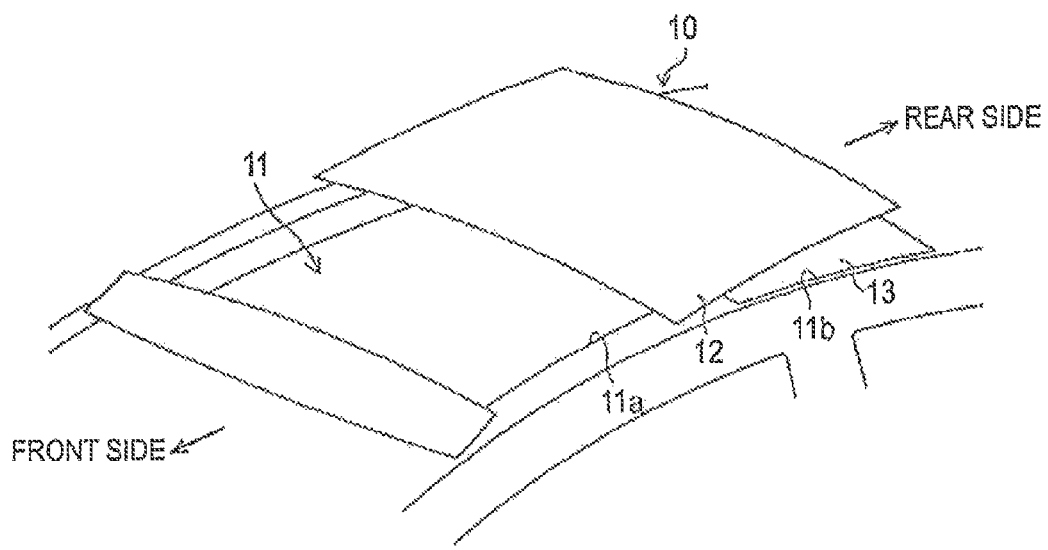

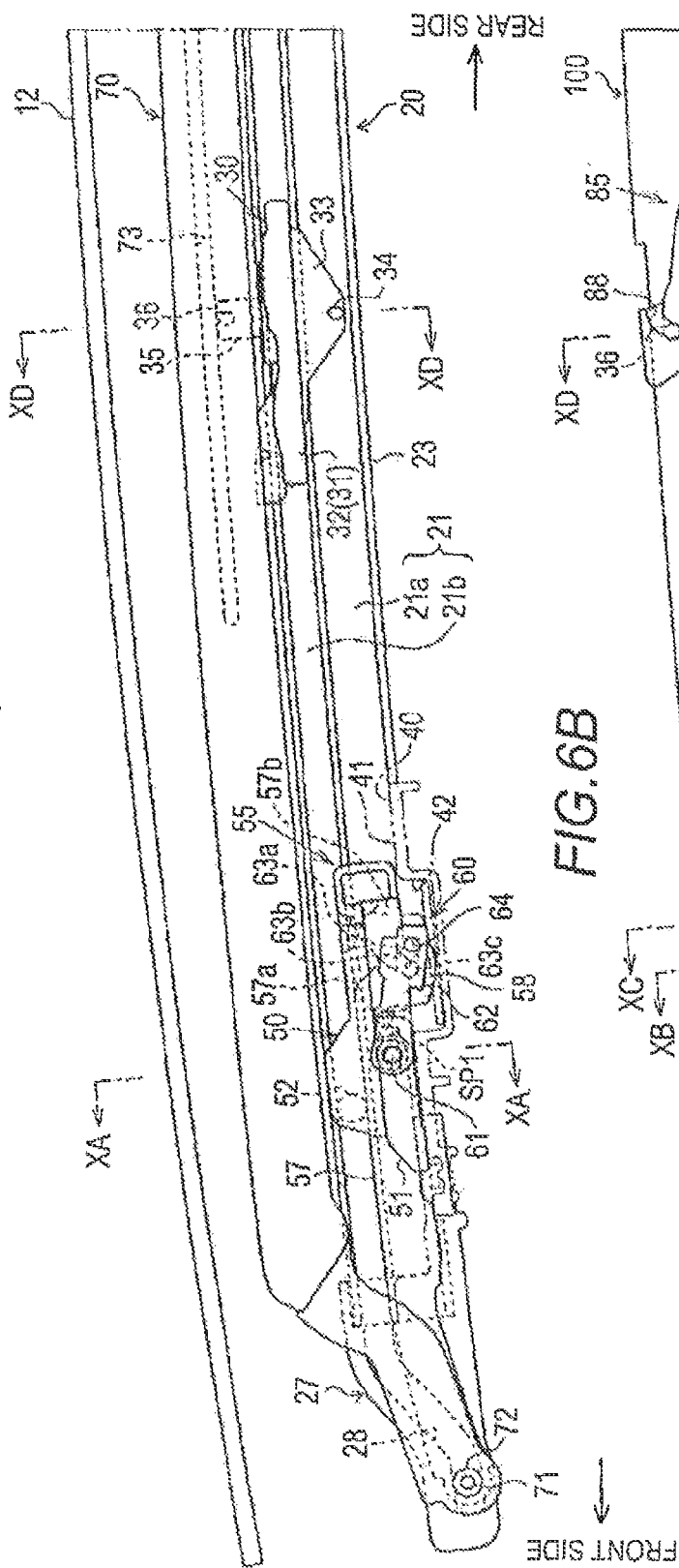

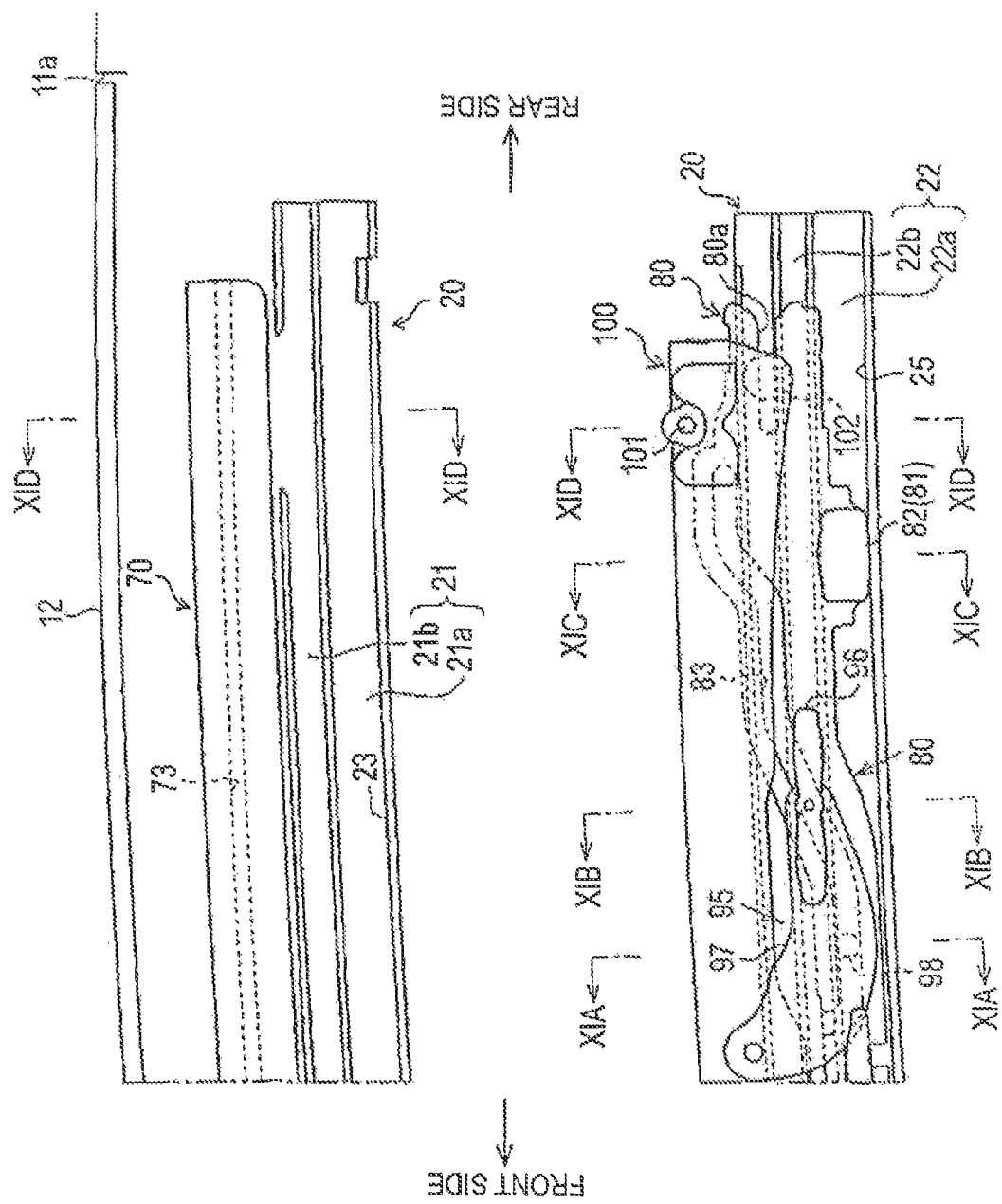

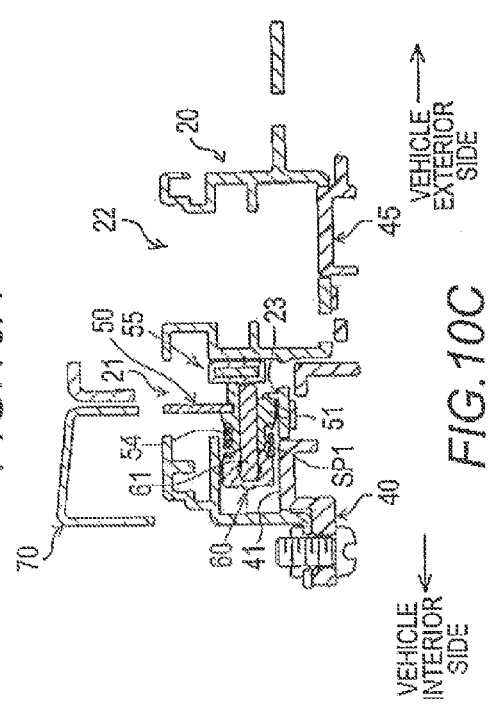

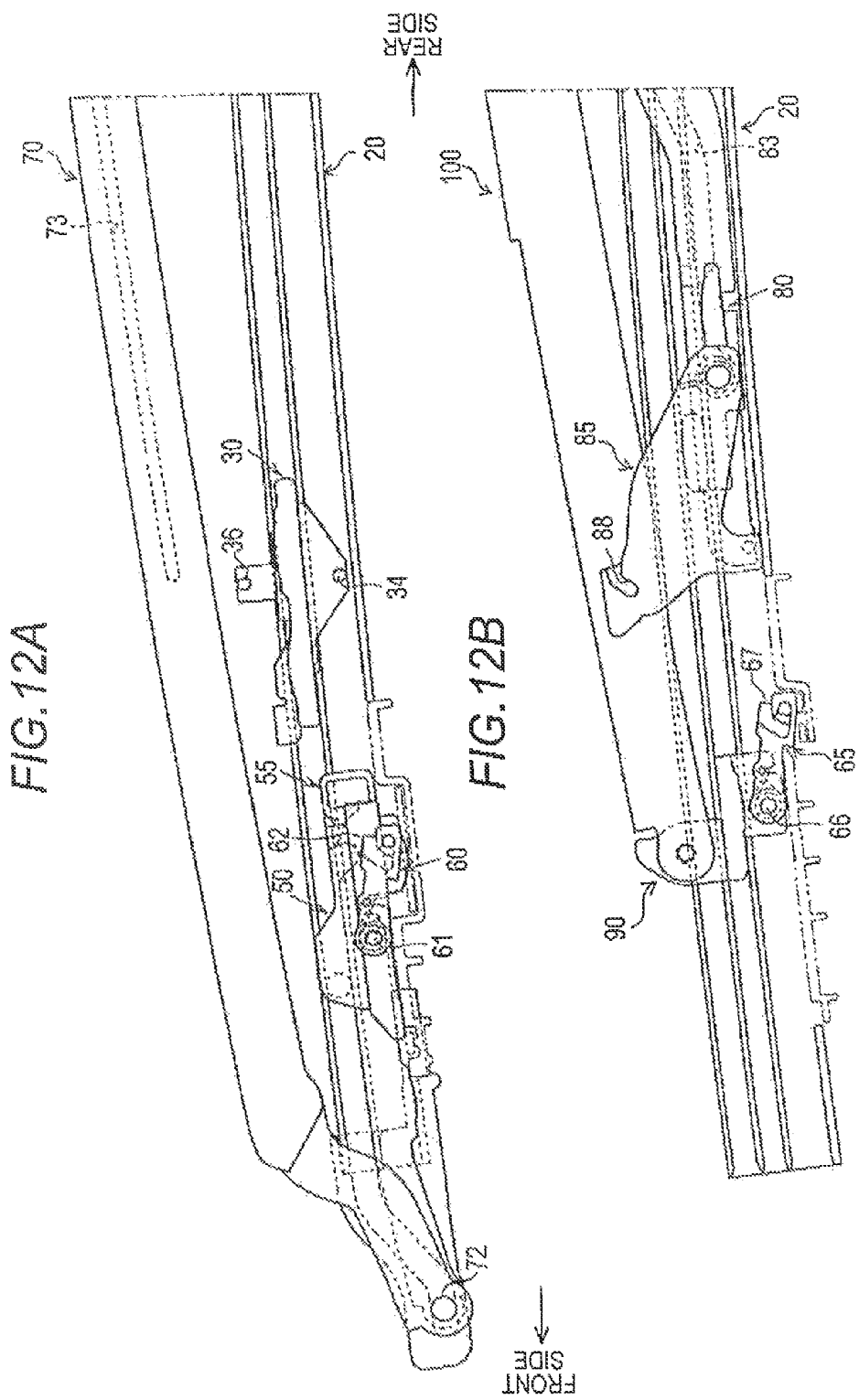

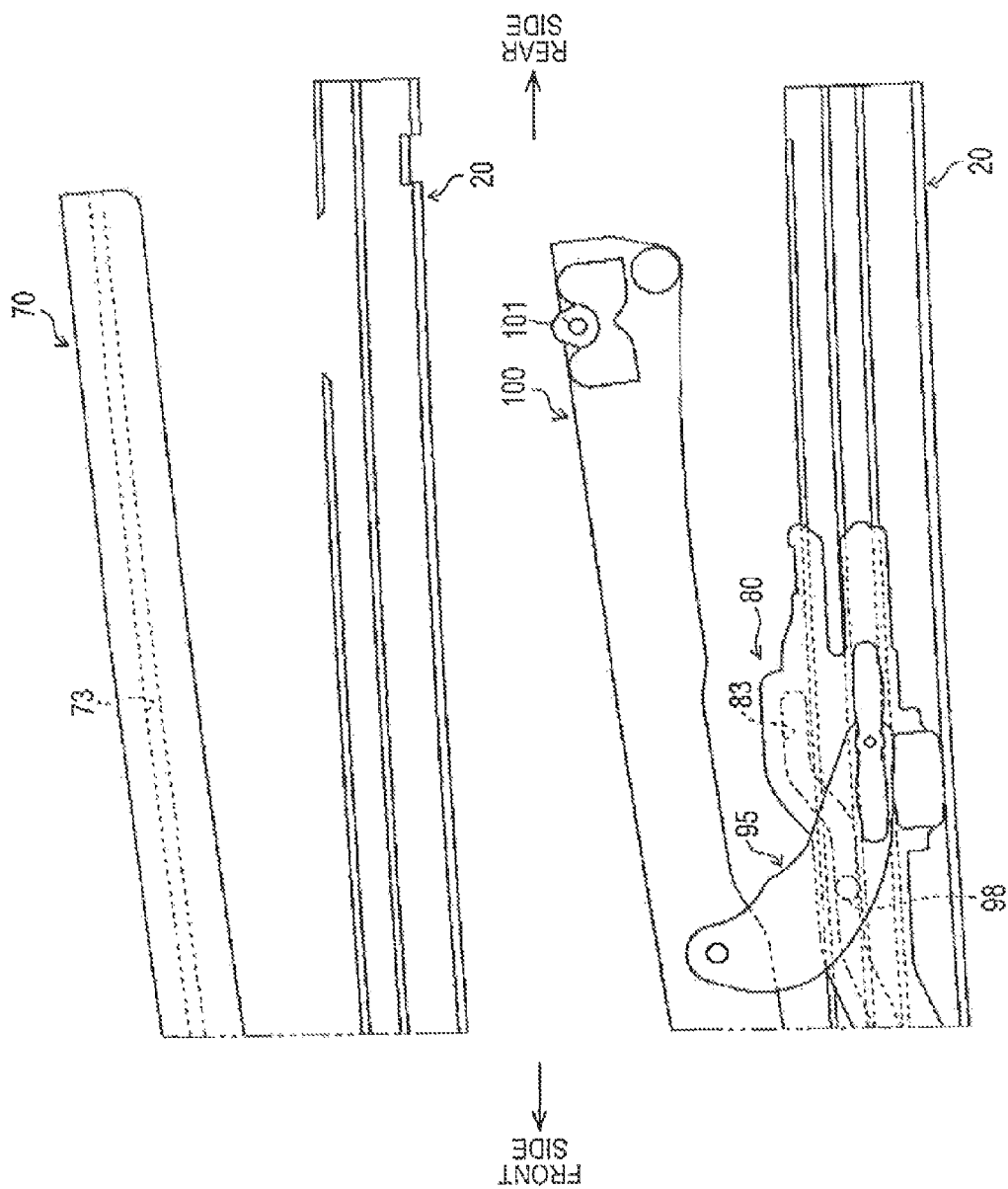

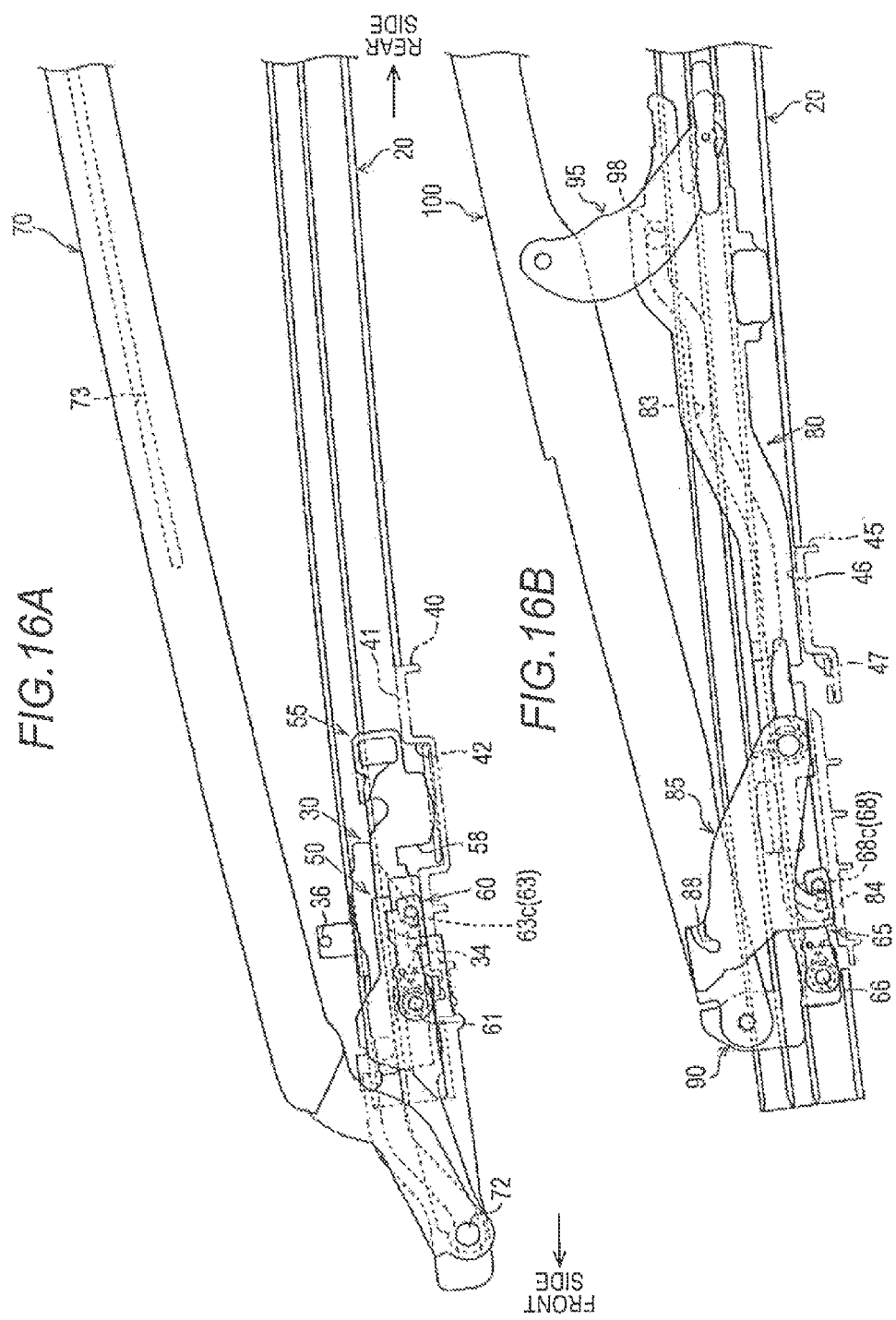

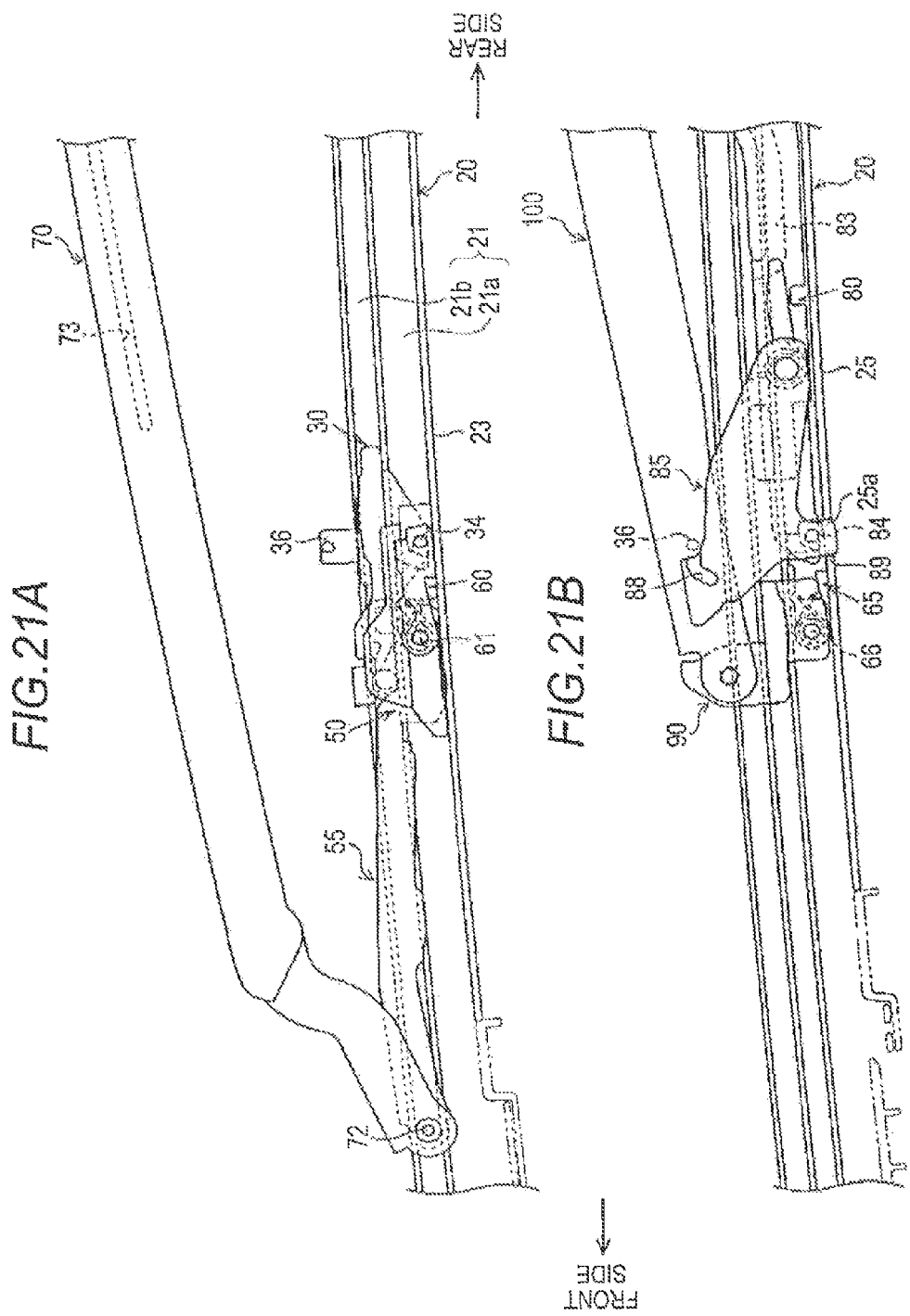

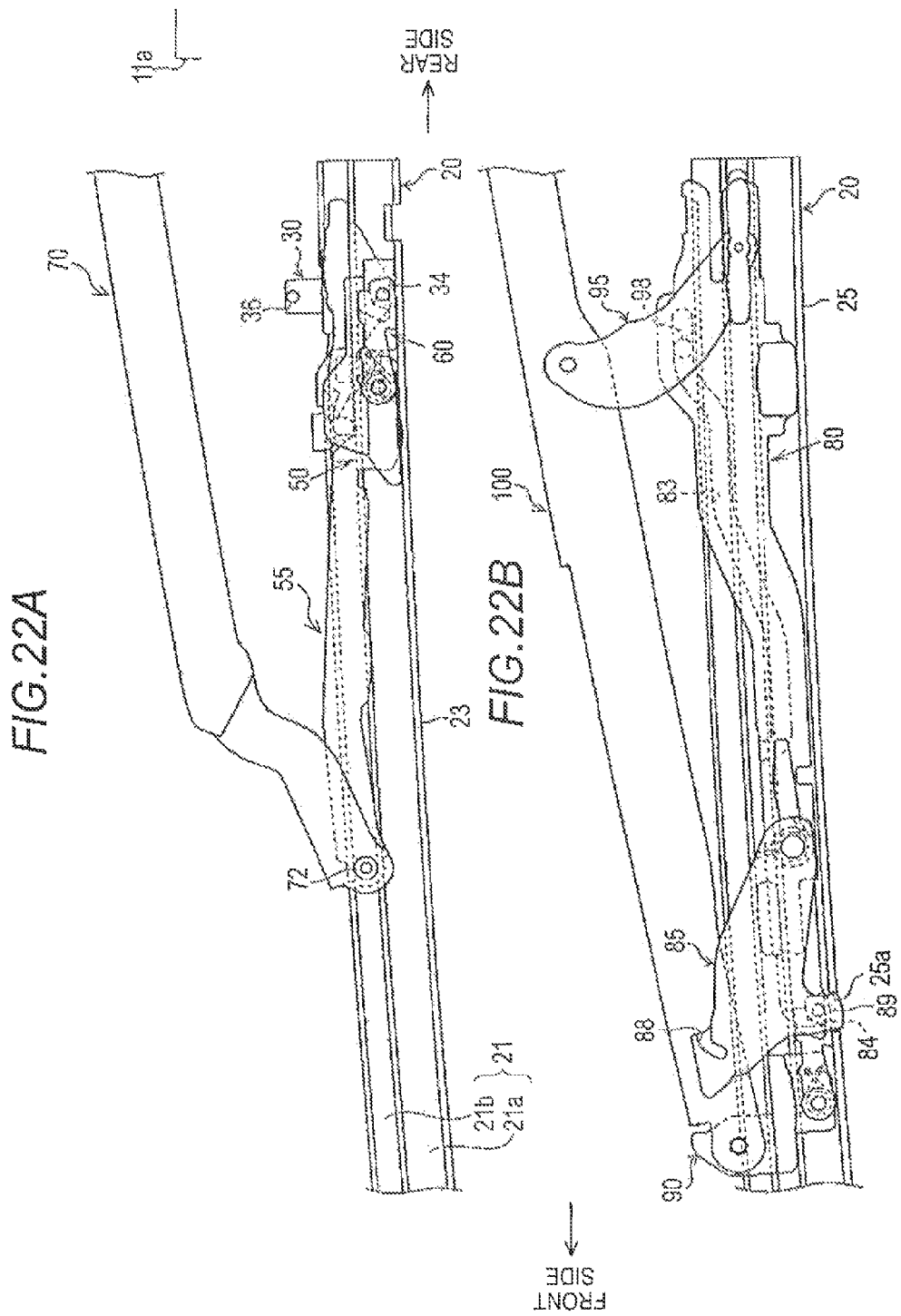

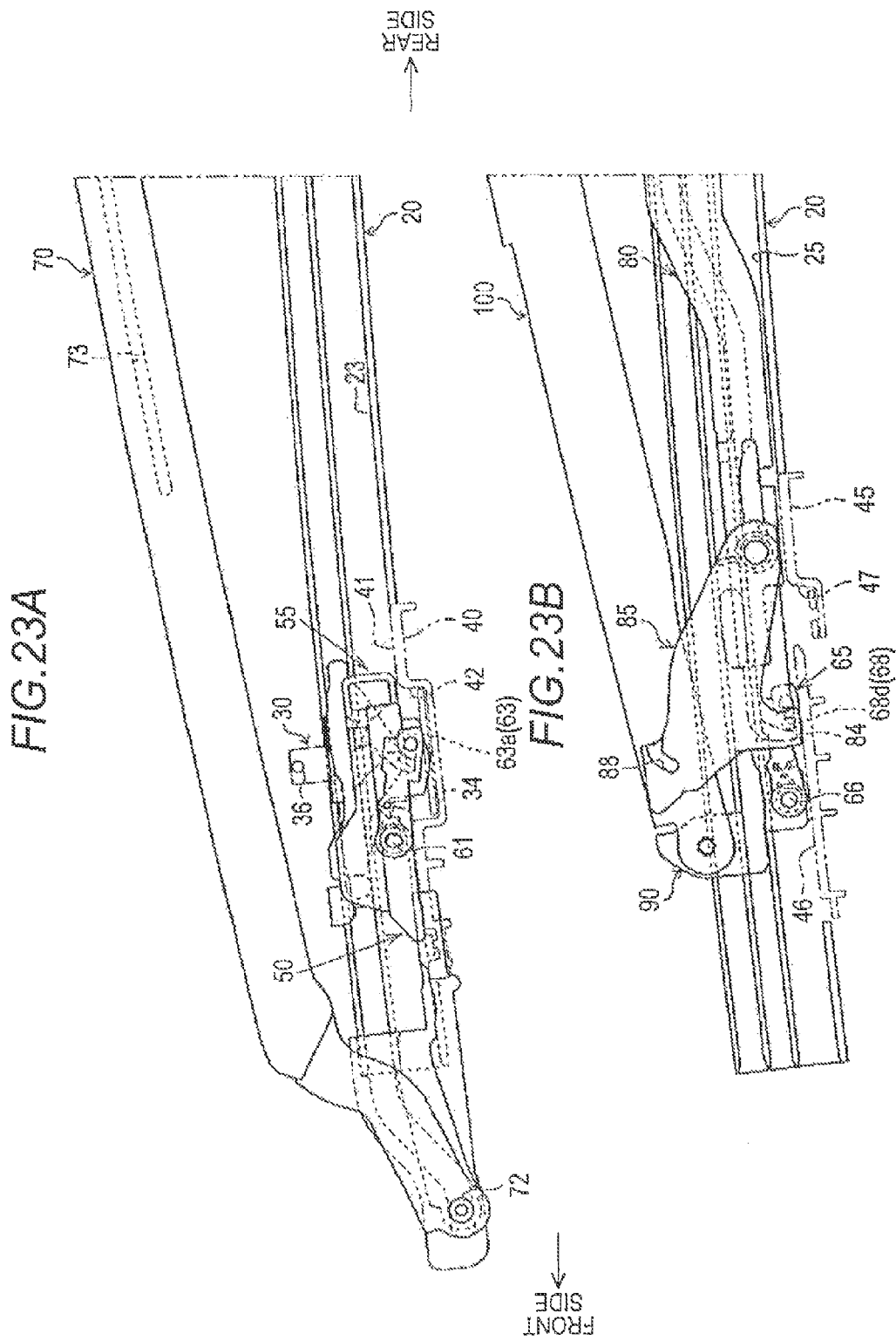

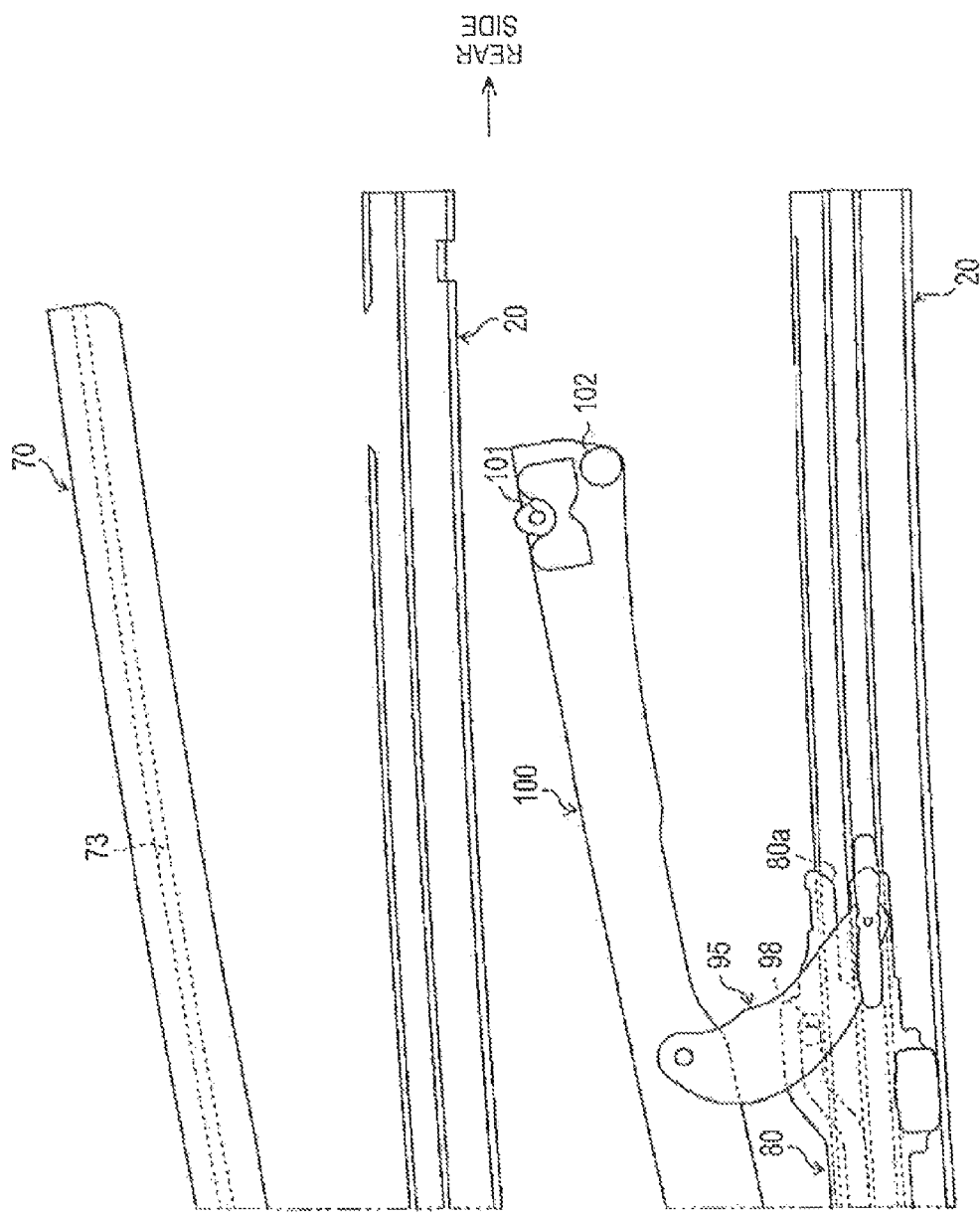

ROOF APPARATUS

CROSS REFERENCE TO RELATED APPLICATIONS

This application is based on and claims priority under 35 U.S.C. §119 to Japanese Patent Application 2014-243475, filed on Dec. 1, 2014, the entire contents of which are incorporated herein by reference.

TECHNICAL FIELD

This disclosure relates to a roof apparatus.

BACKGROUND DISCUSSION

JP 2012-153336A (reference 1) discloses an outer sliding sunroof as a roof apparatus in the related art. In this roof apparatus, during the opening of a movable panel, driving shoes move toward the rear of a vehicle along guide rails such that the movable panel transitions from a fully closed state to a tilted up state. When the driving shoes move further toward the rear of the vehicle, the movable panel transitions from the tilted up state to a fully open state.

In contrast, during the closing of the movable panel, the driving shoes move toward the front of the vehicle along the guide rails such that the movable panel transitions from the fully open state to the tilted up state (the initial state into which the movable panel is tilted upwards and enters from the fully closed state). When the driving shoes move further toward the front of the vehicle, the movable panel transitions from the tilted up state to the fully closed state.

Reference 1 suggests a proposal to increase support rigidity for the movable panel while preventing an increase in the dimension of the guide rails in a longitudinal direction of the vehicle by allowing a rear link (a second support bracket) supporting a functional bracket to move to the midpoint of a movement path along with the functional bracket (a first support bracket) supporting the movable panel during the opening of the movable panel.

In the roof apparatus disclosed in Reference 1, the amount of movement of the driving shoes during a transition from the fully closed state to the fully open state is equal to the amount of movement during a transition from the fully closed state to the tilted up state plus the amount of movement during a transition from the tilted up state to the fully open state. That is, the driving shoes are required to move in the same direction within a limited range of length of the guide rails during a tilt operation and an opening and closing operation of the movable panel. For this reason, when the driving shoes move an increased distance during a transition from the fully closed state to the tilted up state, the driving shoes move a smaller distance during a transition to the fully open state from the titled up state, that is, it is difficult to ensure a required opening area of the movable panel.

SUMMARY

Thus, a need exists for a roof apparatus which is not suspectable to the drawback mentioned above.

A roof apparatus according to an aspect of this disclosure includes: a front member and a rear member which are supported by a guide rail in such a way as to be able to move in a longitudinal direction of a vehicle and as to be engaged with a driving shoe driven to move in the longitudinal direction of the vehicle along the guide rail; a first support bracket, a front end portion of which is supported by the guide rail and is connected to the front member, and which supports a movable panel; and a second support bracket, a front end portion of which is supported by the guide rail, a portion of which is connected to the rear member with the portion being positioned closer to a rear of the vehicle than the front end portion, and which movably supports the first support bracket. The driving shoe is engaged with the rear member and is disengaged from the front member when the movable panel is in a fully closed state, thereby when the driving shoe moves to a front of the vehicle along with the rear member, the second support bracket turns in such a way that a portion of the second support bracket connected to the rear member is raised pivotally to the front end portion of the second support bracket, the first support bracket turns in such a way that a portion of the first support bracket supporting the second support bracket is raised pivotally to the front end portion of the first support bracket, and thus, the movable panel transitions into a tilted up state. The driving shoe is engaged with the front member when the driving shoe moves to the rear of the vehicle after moving further to the front of the vehicle in the tilted up state, thereby the driving shoe moves along with the front member, and the movable panel is being opened while being in the tilted up state. When the amount of movement of the driving shoe to the rear of the vehicle exceeds a predetermined amount, the driving shoe is disengaged from the rear member.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view illustrating a fully closed state in an embodiment disclosed here;

FIG. 2 is a perspective view illustrating an open state in the embodiment;

FIGS. 6A and 6B are side views respectively illustrating a vehicle interior-side structure and a vehicle exterior-side structure of a portion of the guide rail in the fully closed state in the embodiment, which is close to the front of a vehicle;

FIGS. 7A and 7B are side views respectively illustrating the vehicle interior-side structure and the vehicle exterior-side structure of a portion of the guide rail in the fully closed state in the embodiment, which is close to the rear of a vehicle;

FIGS. 10A, 10B, 10C, and 10D respectively illustrate sectional views of a roof apparatus taken along lines XA-XA, XB-XB, XC-XC, and XD-XD in FIG. 6;

FIGS. 12A and 12B are side views respectively illustrating the vehicle interior-side structure and the vehicle exterior-side structure of a portion of the guide rail in a first tilted up state, in the embodiment, which is close to the front of a vehicle;

FIGS. 13A and 13B are side views respectively illustrating the vehicle interior-side structure and the vehicle exterior-side structure of a portion of the guide rail in the first tilted up state in the embodiment, which is close to the rear of a vehicle;

FIGS. 16A and 16B are side views respectively illustrating the vehicle interior-side structure and the vehicle exterior-side structure of the guide rail in the embodiment, which transitions from the fully closed state into a second tilted up state;

FIGS. 21A and 21B are side views respectively illustrating the vehicle interior-side structure and the vehicle exterior-side structure of the guide rail when the amount of movement of a driving shoe to the rear of the vehicle reaches a predetermined amount after the opening of the moving panel from the second tilted up state is started in the embodiment;

FIGS. 22A and 22B are side views respectively illustrating the vehicle interior-side structure and the vehicle exterior-side structure of the guide rail in a fully open state in the embodiment:

FIGS. 23A and 23B are side views respectively illustrating the vehicle interior-side structure and the vehicle exterior-side structure of a portion of the guide rail in the second tilted up state in the embodiment, which is close to the front of the vehicle;

FIGS. 24A and 24B are side views respectively illustrating the vehicle interior-side structure and the vehicle exterior-side structure of a portion of the guide rail in the second tilted up state in the embodiment, which is close to the rear of the vehicle;

DETAILED DESCRIPTION

Figure 3:
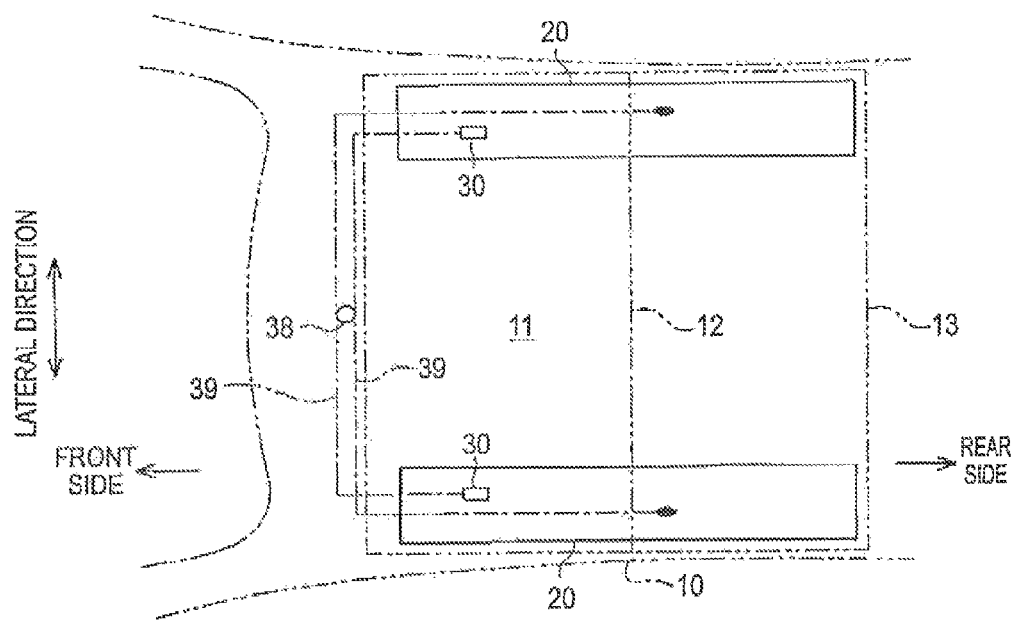
FIG. 3 is a top view illustrating the embodiment.

Hereinafter, an embodiment of a roof apparatus will be described. In the following description, a "longitudinal direction" refers to a longitudinal direction of a vehicle, and an "upper side" and a "lower side" refer to the upper side and the lower side of the vehicle in a vertical direction of the vehicle, respectively. A "vehicle interior side" refers to the inside of the vehicle in a lateral direction of the vehicle, which is a passenger compartment side. A "vehicle exterior side" refers to the outside of the vehicle in the lateral direction, which is the outside of the passenger compartment.

As illustrated in FIGS. 1 and 2, a substantially rectangular opening 11 is formed in a roof 10 of a vehicle such as an automobile. A substantially rectangular movable panel 12 and a substantially rectangular fixed panel 13 made of glass, resin, or the like are installed in the roof 10. The movable panel 12 is attached to the roof 10 in such a way as to be able to open and close a front opening 11a of the opening 11. That is, the movable panel 12 is attached to the roof 10 in such a way that the movable panel 12 can be tilted upward, that is, in such a way that a rear portion of the movable panel 12 moves upward pivotally relative to a front portion of the movable panel 12, and in such a way that the movable panel 12 is capable of sliding in the longitudinal direction. The movable panel 12 adopts a so-called outer sliding method so as to open and close the front opening 11a, that is, the movable panel 12 slides to open and close the front opening 11a while being in the tilted up state. In contrast, the fixed panel 13 is attached to the roof 10 in such a way as to block a rear opening 11b of the opening 11 all the time.

Hereinafter, the structure of the movable panel 12 related to the opening and closing of the movable panel 12 will be described. As illustrated in FIG. 3, a pair of guide rails 20 are disposed in and fixed to both edge portions of the opening 11 in the lateral direction of the vehicle. Each of the guide rails 20 is made of an extruded aluminum alloy material or the like, and extends in the longitudinal direction while having a constant section in a longitudinal direction of the guide rail 20. Driving shoes 30 are respectively guided and supported by the guide rails 20 in such a way as to be able to move in the longitudinal direction.

An electric drive source 38, for example, an electric motor with an output gear and the like is installed in a front edge portion of the opening 11. The electric drive source 38 is connected to the driving shoes 30 through a pair of respective drive belts 39 having a substantially band shape, and made of a resin material. The electric drive source 38 moves both the driving shoes 30 in the longitudinal direction simultaneously. An electronic control unit (hereinafter, which is referred to as an "ECU") (not illustrated) controls the rotation of the electric drive source 38, that is, longitudinal movements of both the driving shoes 30.

Figure 4:
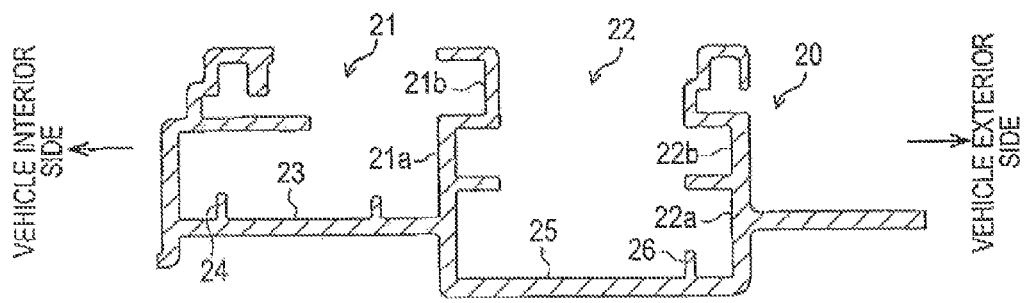
FIG. 4 is a cross-sectional view of a guide rail.

As illustrated in FIG. 4, each of the guide rails 20 includes a first rail portion 21 having an upper portion opening to the vehicle interior side, and a blocked lower portion, and a second rail portion 22 which is adjacent to the first rail portion 21, and has an upper portion opening to the vehicle exterior side, and a blocked lower portion. The first rail portion 21 includes a first lower rail portion 21a and a first upper rail portion 21b which communicate with each other in a vertical direction of the vehicle. The first rail portion 21 includes a first limiting wall portion 24 having a substantially ribbed shape which is erected on a vehicle interior-side portion of a bottom wall 23 of the first rail portion 21. In contrast, the second rail portion 22 includes a second lower rail portion 22a and a second upper rail portion 22b which communicate with each other in the vertical direction of the vehicle. The second rail portion 22 includes a second limiting wall portion 26 having a substantially ribbed shape which is erected on a vehicle exterior-side portion of a bottom wall 25 of the second rail portion 22. The bottom wall 23 of the first rail portion 21 is positioned higher than the bottom wall 25 of the second rail portion 22, and lower than an upper end of the second lower rail portion 22a. An upper end of the first lower rail portion 21a and an upper end of the second upper rail portion 22b are positioned at the same height in the vertical direction of the vehicle.

Figure 5:
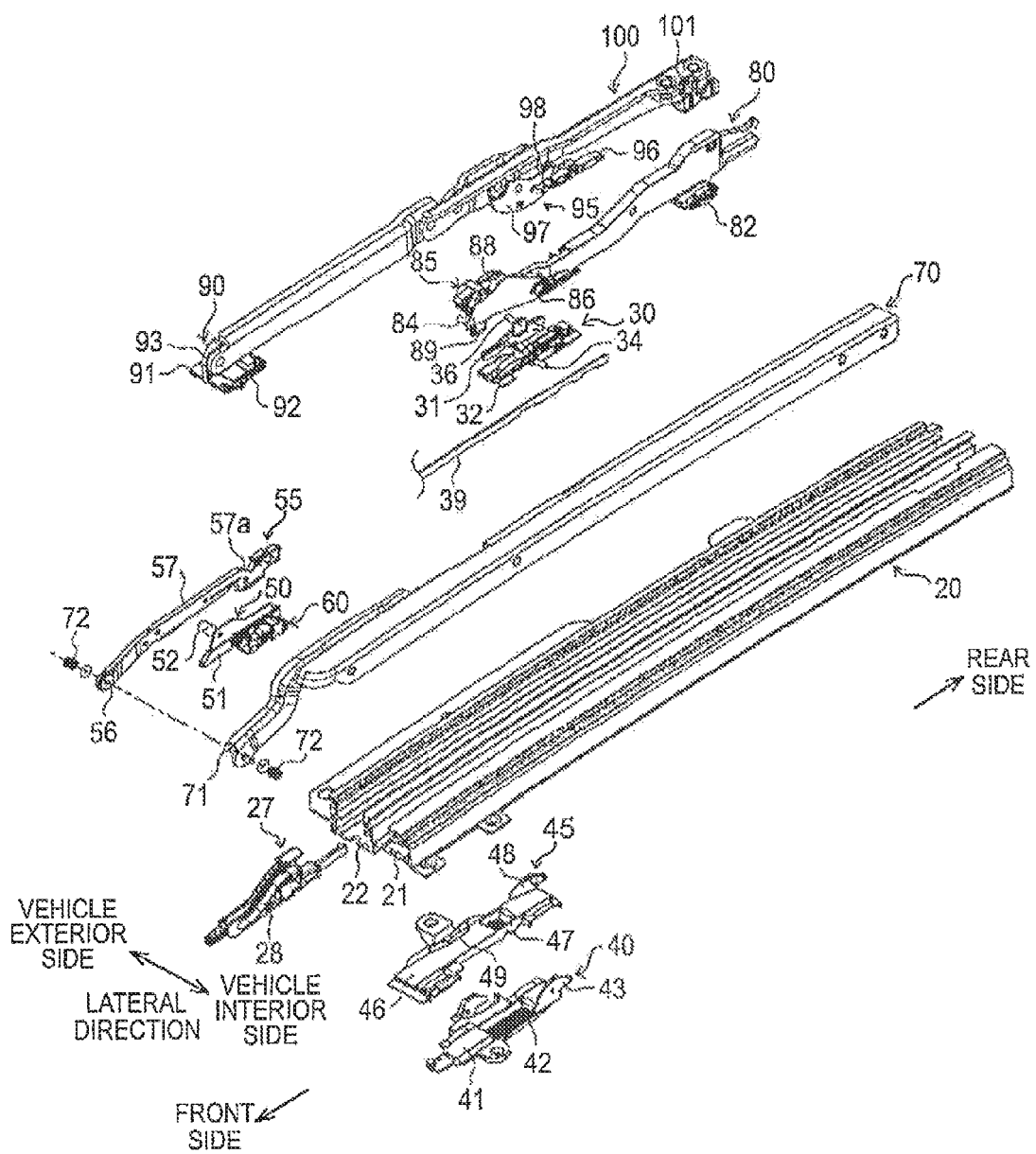
FIG. 5 is an exploded perspective view illustrating the embodiment.

As illustrated in FIGS. 5 and 6A, a front guide member 27 having a substantially fan shape, and made of a resin material or the like is attached to a front end of a vehicle exterior-side portion of the first rail portion 21. Basically, the front guide member 27 further protrudes toward the front of the vehicle than a front end of the guide rail 20. A front guide groove 28 is formed in the front guide member 27 such that the front guide groove 28 is recessed toward the vehicle exterior side from a vehicle interior-side end of the front guide member 27. The front guide groove 28 is formed to have a substantially bow shape which extends obliquely upward and rearward. A front end of the front guide groove 28 is blocked, and a rear end of the front guide groove 28 is open. The front end of the front guide groove 28 is positioned lower than the first rail portion 21, and the rear end communicates with a vehicle exterior-side portion of the first upper rail portion 21b.

Figure 8A:
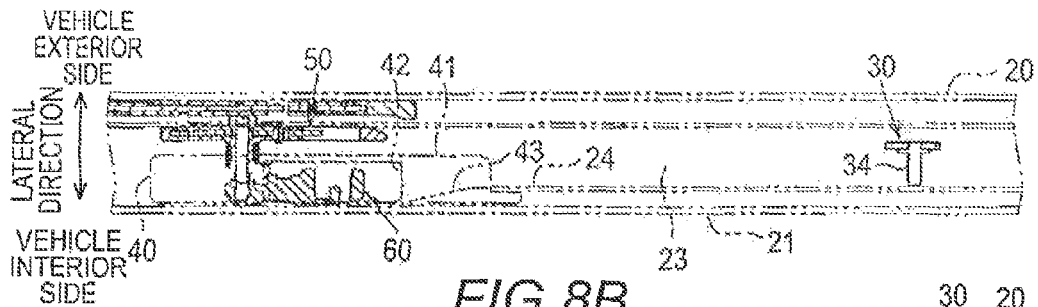
FIGS. 8A and 8B respectively show a top view and a side view illustrating the vehicle interior-side structure of the guide rail in the fully closed state in the embodiment.
Figure 8B:
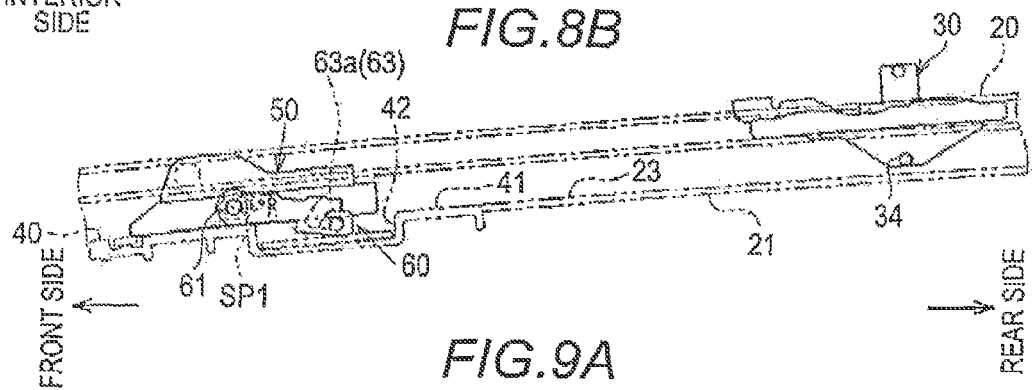

As illustrated in FIGS. 5, 8A and 8B, a first check block 40 made of a resin material or the like is fitted into a front end portion of the first rail portion 21. The first check block 40 includes a bottom wall 41 which is broadened in a region of a vehicle interior-side portion of the first rail portion 21 such that the bottom wall 41 is substantially flush with the bottom wall 23. A first engaging recessed portion 42 having a substantially rectangular shape is formed in a longitudinal intermediate portion of the bottom wall 41 in such a way as to be recessed downward. The first engaging recessed portion 42 opens toward the vehicle interior side, but is blocked by a vehicle interior-side end of the first rail portion 21 adjacent to the first engaging recessed portion 42.

The first check block 40 includes a first block-side limiting wall portion 43 that is continuous with a front end of the first limiting wall portion 24. A vehicle exterior-side surface (which is erected from the bottom wall 41) of the first block-side limiting wall portion 43 extends obliquely from a front end of the first limiting wall portion 24 toward a vehicle interior-side rear end of the first engaging recessed portion 42. That is, the width of a portion of the bottom wall 41 on the vehicle rear side of the first engaging recessed portion 42 is gradually reduced in a rearward direction due to the first block-side limiting wall portion 43. A portion of the bottom wall 41 positioned in the first engaging recessed portion 42 and on the vehicle front side of the first engaging recessed portion 42 has a constant width which is relatively increased.

Figure 9A:
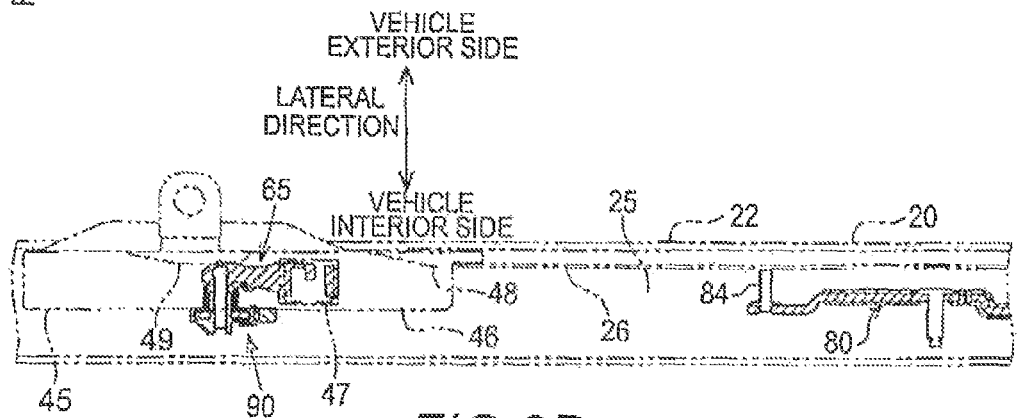
FIGS. 9A and 9B respectively show a top view and a side view illustrating the vehicle exterior-side structure of the guide rail in the fully closed state in the embodiment.
Figure 9B:
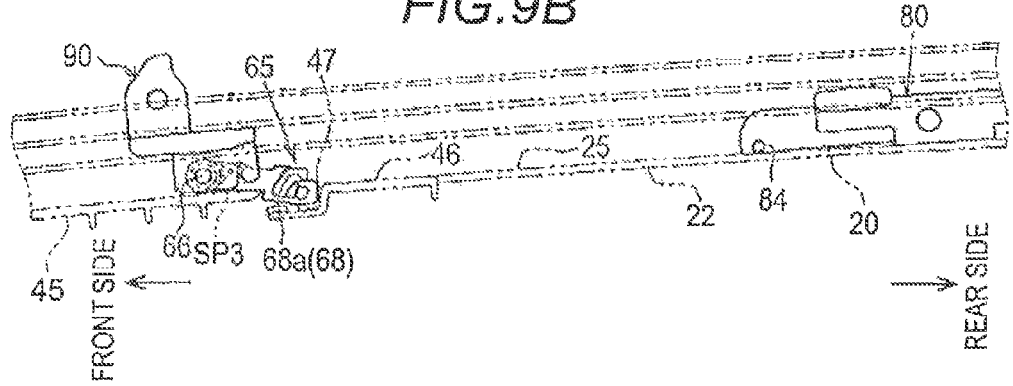

As illustrated in FIGS. 5, 9A, and 9B, a second check block 45 made of a resin material or the like is fitted into a front end portion of the second rail portion 22. The second check block 45 includes a bottom wall 46 which is broadened in a region of a vehicle exterior-side portion of the second rail portion 22 such that the bottom wall 46 is substantially flush with the bottom wall 25. A second engaging recessed portion 47 having a substantially rectangular shape is formed in a longitudinal intermediate portion of the bottom wall 46 in such a way as to be recessed downward.

The second check block 45 includes a second block-side limiting wall portion 48 that is continuous with a front end of the second limiting wall portion 26. A vehicle interior-side surface (which is erected from the bottom wall 46) of the second block-side limiting wall portion 48 extends obliquely from a front end of the second limiting wall portion 26 toward a vehicle exterior-side rear end of the second engaging recessed portion 47. That is, the width of a portion of the bottom wall 46 on the vehicle rear side of the second engaging recessed portion 47 is gradually reduced in the rearward direction due to the second block-side limiting wall portion 48.

The second check block 45 further includes a second block-side limiting wall portion 49 that is positioned on the vehicle front side of the second engaging recessed portion 47. The second block-side limiting wall portion 49 is formed in the shape of a substantially trapezoidal column. A vehicle exterior-side surface of a longitudinal intermediate portion of the second block-side limiting wall portion 49 is positioned on a longitudinal extension of the second limiting wall portion 26. A vehicle exterior-side surface of the second block-side limiting wall portion 49 on the vehicle front side of the intermediate portion extends obliquely toward the vehicle exterior side in a forward direction. A vehicle exterior-side surface of the second block-side limiting wall portion 49 on the vehicle rear side of the intermediate portion extends obliquely toward the vehicle exterior side in the rearward direction. That is, the width of a portion of the bottom wall 46 on the vehicle front side of the second engaging recessed portion 47 is gradually reduced in the forward direction due to the second block-side limiting wall portion 49, is maintained constant after the reduction of the width, and then is gradually increased to a constant width before the reduction of the width. The bottom wall 46 has a constant width, which is relatively increased, at the position of the second engaging recessed portion 47 that is interposed between the second block-side limiting wall portion 48 and the second block-side limiting wall portion 49 in the longitudinal direction.

Figure 29A:
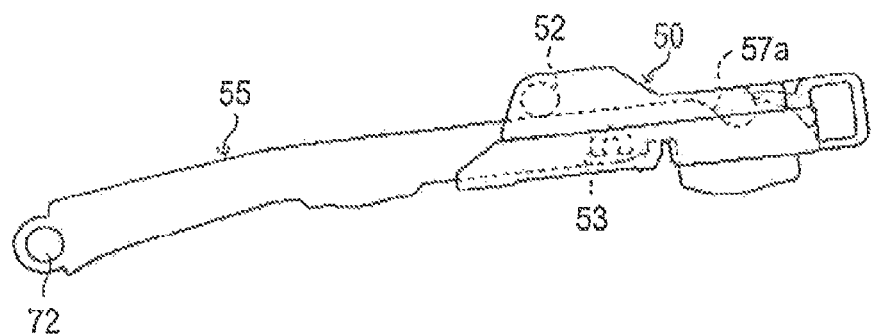
FIGS. 29A to 29C are views illustrating the transition of a front shoe and a front link into an engagement state.
Figure 29B:
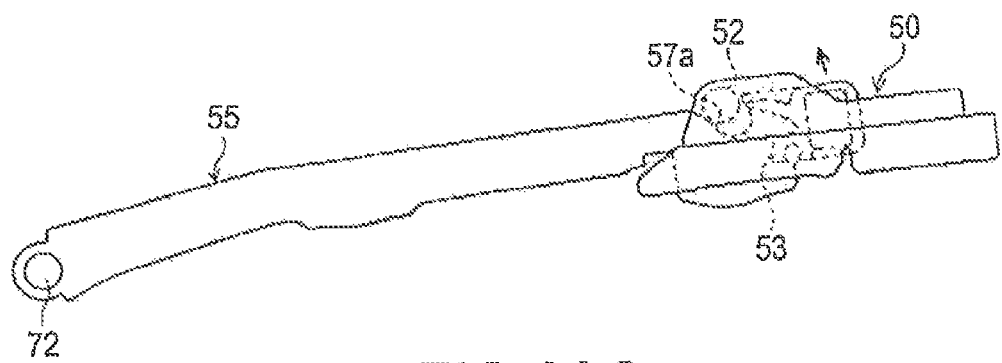
Figure 29C:
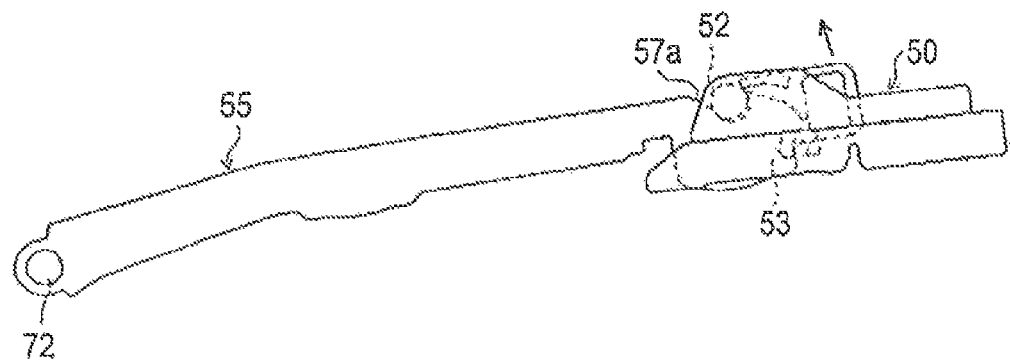

As illustrated in FIGS. 5 and 6A, a front shoe 50 is supported by the first rail portion 21 of the guide rail 20 in such a way as to be able to move in the longitudinal direction. The front shoe 50 has a substantially plate shape, and is erected in the vertical direction of the vehicle. That is, as illustrated in FIG. 10A, the front shoe 50 includes a shoe portion 51 that extends along a lower end of the front shoe 50 in the longitudinal direction. The shoe portion 51 slides against the bottom wall 23 of the first rail portion 21. The front shoe 50 includes a roller 52 that has the shape of a substantially circular column and protrudes from a front upper end portion of the front shoe 50 toward the vehicle exterior side. The roller 52 slides against a vehicle exterior-side portion of the first upper rail portion 21b. As illustrated in FIGS. 29A to 29C, a shoe-side guide wall 53 is provided in the front shoe 50 in such a way as to protrude toward the vehicle exterior side from a vehicle exterior-side end of the roller 52 which is disposed at a rear lower position oblique to the roller 52. The shoe-side guide wall 53 protrudes upward, and has the shape of a substantially arched boss.

As illustrated in FIG. 6A, when the movable panel 12 is in a fully closed state, the longitudinal position of the front shoe 50 is aligned with that of the first check block 40 (the bottom wall 41). Since the shoe portion 51 of the front shoe 50 is positioned on the bottom wall 23 that is positioned closer to the vehicle exterior side than on the bottom wall 41 of the first check block 40, the shoe portion 51 does not slide against the bottom wall 41 during the longitudinal movement of the front shoe 50.

A first rotating check 60 is connected to the front shoe 50 in such a way as to be able to rotate around the axis of the first rotating check 60 which extends in the lateral direction of the vehicle. That is, as illustrated in FIG. 10A, a bearing portion 54 is provided in a longitudinal intermediate portion of the front shoe 50 to protrude toward the vehicle interior side. The bearing portion 54 has the shape of a substantially circular cylinder, and opens in the lateral direction of the vehicle. In contrast, a support pin 61 concentric with the bearing portion 54 and having the shape of a substantially circular column protrudes from a front end portion of the first rotating check 60 toward the vehicle exterior side. The support pin 61 is inserted into and supported by the bearing portion 54 such that the first rotating check 60 is rotatably connected to the front shoe 50. The first rotating check 60 is positioned at the position of the bottom wall 41 (vehicle interior-side portion of the bottom wall 23) in the lateral direction of the vehicle. Since the support pin 61 is inserted into the bearing portion 54 in such a way as to be able to move in the lateral direction of the vehicle, the first rotating check 60 is allowed to move relative to the front shoe 50 in the lateral direction.

As illustrated in FIG. 6A, since one end of a coil spring SP1 is latched onto the front shoe 50, and the other end of the coil spring SP1 is latched onto the first rotating check 60, the first rotating check 60 is biased in a clockwise direction (as illustrated), that is, in a turning direction in which a tip end portion (rear end portion) of the first rotating check 60 is lowered. The coil spring SP1 biases the first rotating check 60 away from the front shoe 50 in the lateral direction of the vehicle (is biased toward the vehicle interior side). Accordingly, the first rotating check 60 is capable of moving between the following two positions in the lateral direction of the vehicle: one position is a position in which the first rotating check 60 comes into contact with the first limiting wall portion 24 of the guide rail 20, and the other position is a position in which the first rotating check 60 comes into contact with the vehicle interior-side end of the first rail portion 21 on the vehicle front side of the first block-side limiting wall portion 43 of the first check block 40.

Figure 27A:
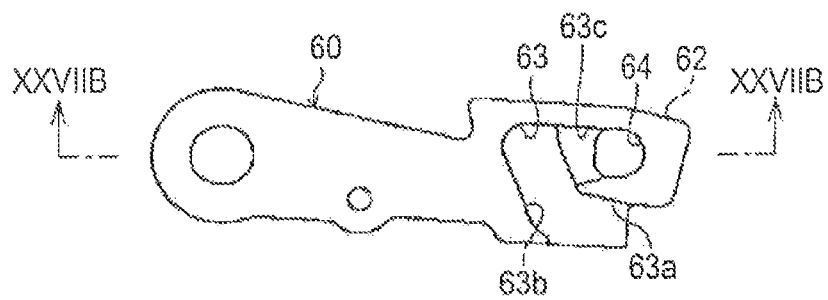
FIG. 27A is a side view illustrating a first rotating check.
Figure 27B:
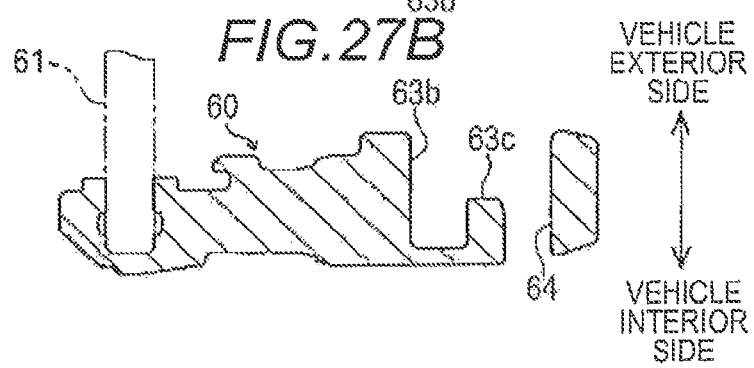
FIG. 27B is a sectional view of the first rotating check taken along line XXVIIB-XXVIIB in FIG. 27A.

A head portion 62 with a mainly lower portion having an increased width is formed in the rear end portion of the first rotating check 60. A first engaging groove 63 having a substantially hook shape is formed in the rear end portion of the first rotating check 60 such that an end surface (vehicle exterior-side surface) (which faces the front shoe 50) of the head portion 62 is recessed toward the vehicle interior side. As illustrated in FIGS. 27A and 27B, the first engaging groove 63 includes a first groove portion 63a that has an open upper end, and extends forward; a second groove portion 63b that communicates with a front end of the first groove portion 63a, and extends obliquely downward and forward; and a third groove portion 63c that communicates with a lower end of the second groove portion 63b, and extends rearward. A rear end of the third groove portion 63c is blocked. An insertion recessed portion 64 is formed at the rear end of the third groove portion 63c of the first rotating check 60. The insertion recessed portion 64 has a substantially circular shape, and opens in the lateral direction of the vehicle.

Basically, the head portion 62 of the first rotating check 60 biased by the coil spring SP1 is in contact with the bottom wall 41 of the first check block 40 or the bottom wall 23 of the guide rail 20. Particularly, when the longitudinal position of the head portion 62 is aligned with that of the first engaging recessed portion 42, the head portion 62 is inserted into the first engaging recessed portion 42. Accordingly, the longitudinal movement of the first rotating check 60 and the front shoe 50 relative to the guide rail 20 is limited. At this time, since the first rotating check 60 is positioned closer to the front of the vehicle than the first block-side limiting wall portion 43 of the first check block 40, the first rotating check 60 is positioned relatively away from the front shoe 50 in the lateral direction of the vehicle. Hereinafter, a "limiting position" refers to the turning position of the first rotating check 60 when the movement of the front shoe 50 is limited.

When the longitudinal position of the head portion 62 is not aligned with that of the first engaging recessed portion 42, limitation to the longitudinal movement of the first rotating check 60 and the front shoe 50 relative to the guide rail 20 is released. Hereinafter, a "release position" refers to the turning position of the first rotating check 60 when the limitation to the movement of the front shoe 50 is released.

When the movable panel 12 is in the fully closed state, the first rotating check 60 is disposed at the limiting position. The longitudinal opening width of the first engaging recessed portion 42 is set to be sufficiently greater than the longitudinal dimension of the head portion 62. The reason for this is that even though an error in the longitudinal position of the driving shoe 30 controlled by the ECU is generated by impacts of product variations, assembly variations, or the like, the head portion 62 is reliably stopped on the upper side of the first engaging recessed portion 42.

As illustrated in FIGS. 5 and 6A, a front end portion of a front link 55 extending in the longitudinal direction and a front end portion of a first support bracket 70 are connected together on the vehicle front side of the front shoe 50 in such a way that the front end portions are capable of turning around the axis extending in the lateral direction of the vehicle. That is, an attachment pin 71 having the shape of a substantially circular column protrudes from the front end portion of the first support bracket 70 toward both sides in the lateral direction of the vehicle. A bearing hole 56 having a substantially circular shape is formed in the front link 55 in such a way as to penetrate through the front end portion of the front link 55 in the lateral direction of the vehicle. The front link 55 is disposed on the vehicle exterior side of the first support bracket 70. A guide pin 72 having the shape of a substantially circular cylinder is mounted on a tip end portion of the attachment pin 71 (which is inserted into the hearing hole 56 from the vehicle interior side, and passes through the bearing hole 56) such that the front link 55 is turnably connected to the first support bracket 70. The same guide pin 72 is also mounted on a vehicle interior-side tip end portion of the attachment pin 71.

The front link 55 includes an arm portion 57 that extends from the bearing hole 56 toward the rear of the vehicle, and is disposed in the vehicle exterior-side portion of the first rail portion 21 which is positioned closer to the vehicle exterior side than the front shoe 50. An engaging groove 57a having a substantially U shape is formed in a rear end portion of the arm portion 57 such that an upper end of the rear end portion is recessed obliquely downward and rearward. A link-side guide wall 57b having a substantially bow shape protrudes toward the vehicle interior side from the rear end portion of the arm portion 57, is positioned on the vehicle rear side of the engaging groove 57a, and protrudes obliquely upward and rearward. The link-side guide wall 57b and the shoe-side guide wall 53 form an expediting portion. A bent portion 58 is provided in the rear end portion of the arm portion 57 in such a way as to protrude downward. When the movable panel 12 is in the fully closed state, an upper end of the arm portion 57 extends along the guide rail 20 in the longitudinal direction, and is in contact with or is positioned close to a lower end of the roller 52 at a location in which the upper end of the arm portion 57 is positioned closer to the front side of the vehicle than the engaging groove 57a. At this time, the bent portion 58 is inserted into the first engaging recessed portion 42 of the first check block 40.

Since the roller 52 is in contact with or is positioned close to the upper end of the arm portion 57, when the front shoe 50 moves relative to the front link 55 in the longitudinal direction, the turning of the front link 55 is limited. As illustrated in FIGS. 29A to 29C, when the roller 52 of the front shoe 50 moving to the rear of the vehicle relative to the front link 55 approaches the engaging groove 57a, the shoe-side guide wall 53 presses the link-side guide wall 57b such that the turning of the front link 55 in a counter-clockwise direction (illustrated) is expedited, that is, turning to lift the engaging groove 57a upward is expedited. Accordingly, the roller 52 comes into contact with a rear end of the engaging groove 57a lifted upward, and the roller 52 is engaged into the engaging groove 57a while the front link 55 is turned. That is, the front link 55 is engaged with the front shoe 50 (the roller 52) such that the front link 55 turns toward a predetermined engagement position. The link-side guide wall 57b and the shoe-side guide wall 53 (both of which form the expediting portion) disposed between the front link 55 and the front shoe 50 expedite the turning of the front link 55 to the vicinity of the engagement position prior to the engagement between the front link 55 and the front shoe 50. When the front shoe 50 moves further to the rear of the vehicle in this state, the front link 55 moves integrally with the first support bracket 70 to the rear of the vehicle.

As illustrated in FIG. 6A, the first support bracket 70 supports the movable panel 12 attached to an upper surface of the first support bracket 70. When the movable panel 12 is in the fully closed state, the vehicle exterior-side guide pin 72 attached to the first support bracket 70 is turnably and movably mounted in the front guide groove 28 of the front guide member 27. Accordingly, when the first support bracket 70 moves to the rear of the vehicle, the vehicle exterior-side guide pin 72 ascends the front guide groove 28, and enters a vehicle exterior-side portion of the first upper rail portion 21b. At the same time, the vehicle interior-side guide pin 72 attached to the first support bracket 70 enters a vehicle interior-side portion of the first upper rail portion 21b. The first support bracket 70 is positioned above the front shoe 50, and extends in the longitudinal direction. A guide groove 73 is formed in the first support bracket 70 such that a vehicle exterior-side end of the first support bracket 70 is recessed toward the vehicle interior side from a longitudinal intermediate portion to a rear end of the first support bracket 70.

Figure 17A:
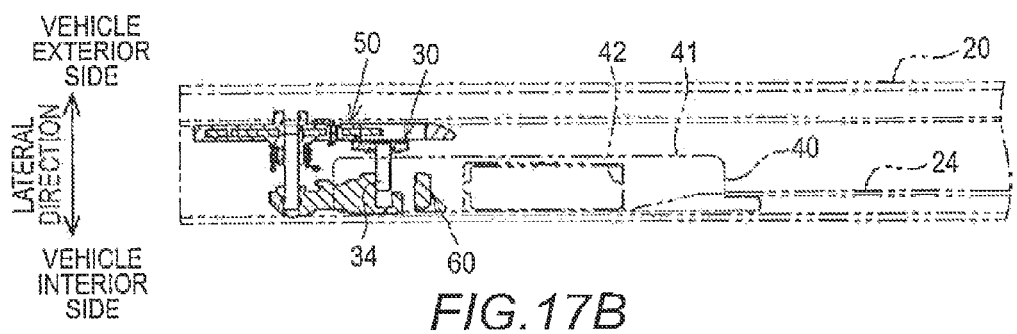
FIGS. 17A and 17B respectively show a top view and a side view illustrating the vehicle interior-side structure of the guide rail in the second tilted up state in the embodiment.
Figure 17B:
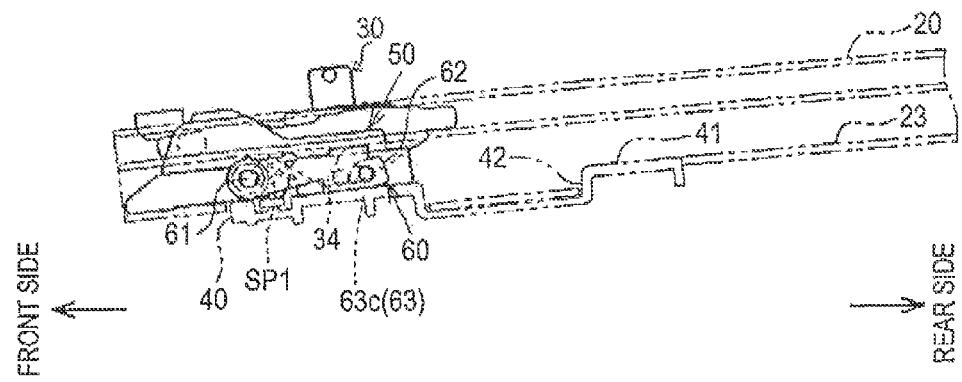

As illustrated in FIGS. 5 and 6A, when the movable panel 12 is in the fully closed state, the driving shoe 30 is positioned on the vehicle rear side of the front shoe 50. As illustrated in FIG. 10D, the driving shoe 30 includes a pair of shoe portions 31 and 32 which slide against the vehicle exterior-side portion and the vehicle interior-side portion of the first upper rail portion 21b, respectively. The driving shoe 30 bestrides the first rail portion 21 in the lateral direction of the vehicle. The driving shoe 30 includes an attachment piece 33 that extends downward from a vehicle-interior side end of the driving shoe 30. The attachment piece 33 is disposed between the front shoe 50 and the first rotating check 60 in the lateral direction of the vehicle. A first engaging protrusion 34 having a substantially pin shape is provided in the attachment piece 33 in such a way as to protrude toward the vehicle interior side. The first engaging protrusion 34 is disposed in such a way that the longitudinal movement locus of the first engaging protrusion 34 along the guide rail 20 passes through the first groove portion 63a of the first rotating check 60 present at the limiting position. Alternatively, as illustrated in FIGS. 16A and 17B, the first engaging protrusion 34 is disposed in such a way that the longitudinal movement locus of the first engaging protrusion 34 along the guide rail 20 passes through the third groove portion 63c of the first rotating check 60 present at the release position. The driving shoe 30 includes an attachment piece 35 that extends upward from a vehicle exterior-side end of the driving shoe 30. An engaging and disengaging pin 36 having a substantially pin shape is provided in the attachment piece 35 in such a way as to protrude toward the vehicle exterior side, and as to enter the second rail portion 22 from the upper side.

As illustrated in FIGS. 5 and 7B, a rear guide member 80 extending in the longitudinal direction is supported by the second lower rail portion 22a of the guide rail 20 in such a way as to be able to move in the longitudinal direction. That is, as illustrated in FIG. 11C, the rear guide member 80 includes a pair of shoe portions 81 and 82 which slide against a vehicle exterior-side portion and a vehicle interior-side portion of the second lower rail portion 22a. The rear guide member 80 bestrides the second rail portion 22 in the lateral direction of the vehicle.

A rear guide groove 83 is formed in the rear guide member 80 such that a vehicle exterior-side end of the rear guide member 80 is recessed toward the vehicle interior side. Basically, the rear guide groove 83 is inclined upward toward the rear of the vehicle. A front end of the rear guide groove 83 is bent upward and is open, and a rear end of the rear guide groove 83 is blocked. In the vertical direction of the vehicle, the front end of the rear guide groove 83 is positioned at the level of the second lower rail portion 22a, and the rear end is positioned higher than the second upper rail portion 22b (the second rail portion 22). A leading-in portion 80a having a substantially U shape is formed at the rear end of the rear guide member 80, and opens to the rear of the vehicle. As illustrated in FIG. 6B, a second engaging protrusion 84 having the shape of a substantially circular column is provided in a front end portion or the rear guide member 80 in such a way as to protrude toward the vehicle exterior side.

A check member 85 is connected to the front end portion of the rear guide member 80 (which is positioned closer to the front of the vehicle than the rear guide groove 83) in such a way as to be able to turn around the axis extending in the lateral direction of the vehicle. The check member 85 has a substantially plate shape, and is erected in the vertical direction of the vehicle. That is, a support protrusion 86 having the shape of a substantially circular cylinder is provided in a rear end portion of the check member 85 in such a way as to protrude toward the vehicle interior side. A connection pin 87 having the shape of a substantially circular column is mounted on the support protrusion 86, and protrudes to the vehicle exterior side toward the rear guide member 80. The rear guide member 80 and the check member 85 are connected together in such a way as to be able to turn around the connection pin 87 relative to each other. The support protrusion 86 is mounted on a vehicle interior-side portion of the second lower rail portion 22a in such a way as to be able to turn and move in the longitudinal direction.

An engaging groove 88 is formed in a front upper end portion (which protrudes upward further than the second rail portion 22) of the check member 85 such that a vehicle interior-side end of the front upper end portion is recessed toward the vehicle exterior side. The engaging groove 88 is inclined upward toward the rear of the vehicle. A front end of the engaging groove 88 is blocked, and a rear end of the engaging groove 88 is open. When the movable panel 12 is in the fully closed state, as illustrated in FIG. 6A, the engaging and disengaging pin 36 of the driving shoe 30 is positioned at a lower end of the engaging groove 88. A limiting portion 89 having a substantially rectangular shape is provided in the front end portion of the check member 85 in such a way as to protrude downward from a lower end of the front end portion. A coil spring SP2 is wrapped around the support protrusion 86 in such a way that one end of the coil spring SP2 is latched onto the rear guide member 80, and the other end is latched onto the check member 85. The coil spring SP2 biases the check member 85 in the counterclockwise direction (as illustrated), that is, in a turning direction in which the limiting portion 89 comes into the bottom wall 25 of the second rail portion 22. Particularly, as illustrated in FIG. 6B, a limiting hole 25a is formed in the bottom wall 25 in such a way that the limiting hole 25a is adjacent to the vehicle rear side of the limiting portion 89, and opens in the vertical direction of the vehicle. When the limiting portion 89 reaches the limiting hole 25a, the limiting portion 89 is engaged into the limiting hole 25a.

As described above, when the driving shoe 30 moves to the front of the vehicle in the fully closed state of the movable panel 12, the check member 85 moves to the front of the vehicle along with the rear guide member 80 while the support protrusion 86 and the limiting portion 89 slide against the vehicle interior-side portion of the second lower rail portion 22a and the bottom wall 25, respectively. At this time, both the shoe portions 81 and 82 of the rear guide member 80 slide against the vehicle exterior-side portion and the vehicle interior-side portion of the second lower rail portion 22a, respectively.

As illustrated in FIGS. 5 and 6B, a rear shoe 90 is supported by a portion (which is positioned closer to the front of the vehicle than the check member 85) of the second upper rail portion 22b of the guide rail 20 in such a way as to be able to move in the longitudinal direction. That is, as illustrated in FIGS. 10B and 10C, the rear shoe 90 includes a pair of shoe portions 91 and 92 which slide against a vehicle exterior-side portion and a vehicle interior-side portion of the second upper rail portion 22b, respectively. The rear shoe 90 bestrides the second rail portion 22 in the lateral direction of the vehicle. An attachment piece 93 having a substantially plate shape is provided in a center portion of the rear shoe 90 in the lateral direction of the vehicle in such a way as to extend upward and to protrude further than the second rail portion 22. An attachment piece 94 having a substantially plate shape is provided in the center portion of the rear shoe 90 in the lateral direction of the vehicle in such a way as to extend downward and to enter the second lower rail portion 22a.

As illustrated in FIG. 6B, when the movable panel 12 is in the fully closed state, the longitudinal position of the rear shoe 90 is aligned with that of the second check block 45 (the bottom wall 46). Since both the shoe portions 91 and 92 are mounted on the second upper rail portion 22b, the rear shoe 90 moving in the longitudinal direction does not slide against the bottom wall 46.

A second rotating check 65 is connected to the rear shoe 90 in such a way as to be able to turn around the axis extending in the lateral direction of the vehicle. That is, as illustrated in FIG. 10C, a bearing portion 94a is provided in the attachment piece 94 of the rear shoe 90 in such a way as to protrude toward the vehicle exterior side. The bearing portion 94a has the shape of a substantially circular cylinder, and opens in the lateral direction of the vehicle. In contrast, a support pin 66 is provided in a front end portion of the second rotating check 65 in such a way as to protrude toward the vehicle interior side. The support pin 66 is concentric with the bearing portion 94a, and has the shape of a substantially circular column. The support pin 66 is inserted into and supported by the bearing portion 94a such that the second rotating check 65 is rotatably connected to the rear shoe 90. The second rotating check 65 is positioned at the position of the bottom wall 46 (vehicle exterior-side portion of the bottom wall 25) in the lateral direction of the vehicle. Since the support pin 66 is inserted into the bearing portion 94a in such a way as to be able to move in the lateral direction of the vehicle, the second rotating check 65 is allowed to move relative to the rear shoe 90 in the lateral direction.

As illustrated in FIG. 6B, since one end of a coil spring SP3 is latched onto the rear shoe 90, and the other end of the coil spring SP3 is latched onto the second rotating check 65, the second rotating check 65 is biased in the clockwise direction (as illustrated), that is, in a turning direction in which a tip end portion (rear end portion) of the second rotating check 65 is lowered. The coil spring SP3 biases the second rotating check 65 away from the rear shoe 90 in the lateral direction of the vehicle (is biased toward the vehicle exterior side). Accordingly, the second rotating check 65 is capable of moving between the following two positions in the lateral direction of the vehicle: one position is a position in which the second rotating check 65 comes into contact with the second limiting wall portion 26 of the guide rail 20, and the other position is a position in which the second rotating check 65 comes into contact with a vehicle exterior-side end of the second rail portion 22 at a position that is interposed between second block-side limiting wall portions 48 and 49 in the longitudinal direction.

Figure 28A:
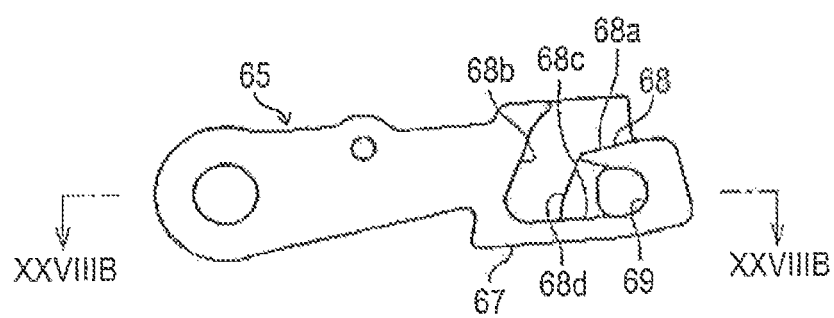
FIG. 28A is a side view illustrating a second rotating check.
Figure 28B:
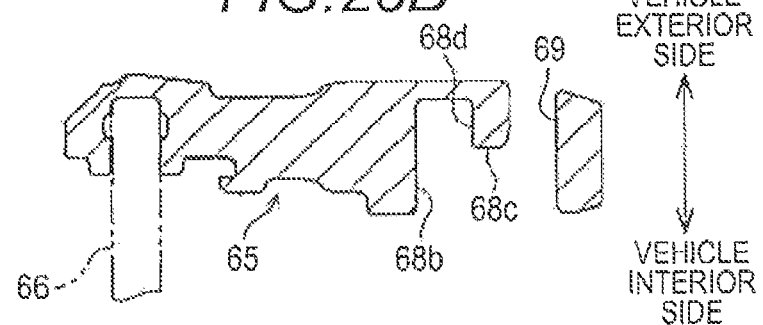
FIG. 28B is a sectional view of the second rotating check taken along line XXVIIIB-XXVIIIB in FIG. 28A.

A head portion 67 with a mainly lower portion having an increased width is formed in a rear end portion of the second rotating check 65. A second engaging groove 68 having a substantially hook shape is formed in the rear end portion of the second rotating check 65 such that an end surface (vehicle interior-side surface) (which faces the rear shoe 90) of the head portion 67 is recessed toward the vehicle exterior side. The longitudinal dimension of the head portion 67 is set to be equal to or to be slightly less than the longitudinal opening width of the second engaging recessed portion 47. As illustrated in FIGS. 28A and 28B, the second engaging groove 68 includes a first groove portion 68a that has an open upper end, and extends forward; a second groove portion 68b that communicates with a front end of the first groove portion 68a, and extends obliquely downward and forward; and a third groove portion 68c that communicates with a lower end of the second groove portion 68b, and extends rearward. A rear end of the third groove portion 68c is blocked. A vehicle interior-side inner wall surface of the third groove portion 68c is projected toward the vehicle interior side further than a vehicle interior-side inner wall surface of the second groove portion 68b. The second engaging groove 68 forms a step-like pressed surface 68d at the longitudinal position of the boundary between the second groove portion 68b and the third groove portion 68c. An insertion recessed portion 69 is formed at the rear end of the third groove portion 68c of the second rotating check 65.

The insertion recessed portion 69 has a substantially circular shape, and opens in the lateral direction of the vehicle.

Basically, the head portion 67 of the second rotating check 65 biased by the coil spring SP3 is in contact with the bottom wall 46 of the second check block 45 or the bottom wall 25 of the guide rail 20. Particularly, when the longitudinal position of the head portion 67 is aligned with that of the second engaging recessed portion 47, the head portion 67 is inserted into the second engaging recessed portion 47. Accordingly, the longitudinal movement of the second rotating check 65 and the rear shoe 90 relative to the guide rail 20 is limited. At this time, since the second rotating check 65 is positionally interposed between the second block-side limiting wall portions 48 and 49 in the longitudinal direction, the second rotating check 65 is positioned relatively away from the rear shoe 90. Hereinafter, a "limiting position" refers to the turning position of the second rotating check 65 when the movement of the rear shoe 90 is limited.

When the longitudinal position of the head portion 67 is not aligned with that of the second engaging recessed portion 47, limitation to the longitudinal movement of the second rotating check 65 and the rear shoe 90 relative to the guide rail 20 is released. Hereinafter, a "release position" refers to the turning position of the second rotating check 65 when the limitation to the movement of the rear shoe 90 is released.

Figure 18A:
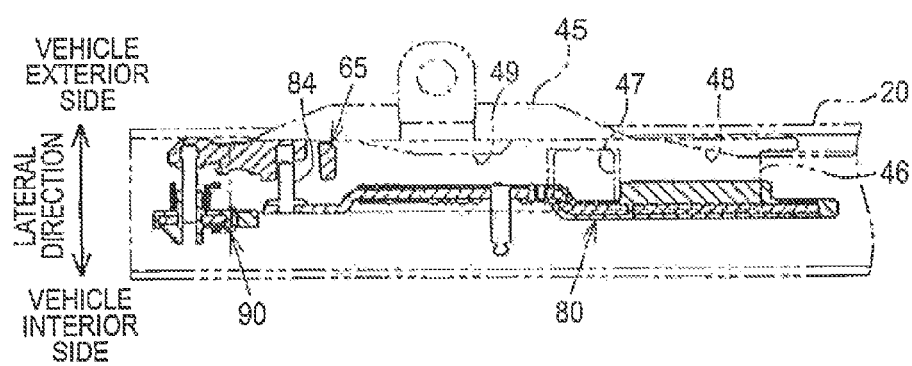
FIGS. 18A and 18B respectively show a top view and a side view illustrating the vehicle exterior-side structure of the guide rail in the second tilted up state in the embodiment.
Figure 18B:
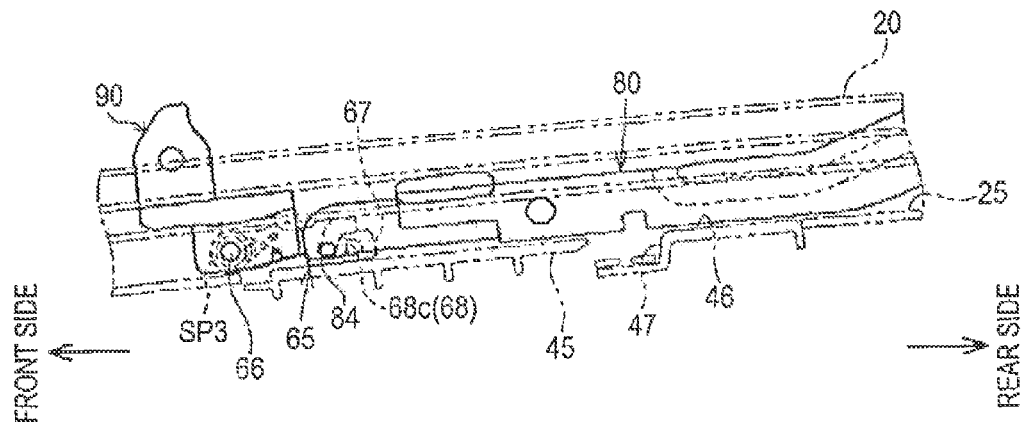

The front end portion of the rear guide member 80 and the limiting portion 89 of the check member 85 are disposed between the rear shoe 90 and the second rotating check 65 in the lateral direction of the vehicle. The rear guide member 80 and the limiting portion 89 are positioned closer to the rear of the vehicle than the rear shoe 90 and the like. The second engaging protrusion 84 is disposed in such a way that the longitudinal movement locus of the second engaging protrusion 84 along the guide rail 20 passes through the first groove portion 68a of the second rotating check 65 present at the limiting position. Alternatively, as illustrated in FIGS. 16A and 18B, the second engaging protrusion 84 is disposed in such a way that the longitudinal movement locus of the second engaging protrusion 84 along the guide rail 20 passes through the third groove portion 68c of the second rotating check 65 present at the release position. When the movable panel 12 is in the fully closed state, the second rotating check 65 is disposed at the limiting position.

As illustrated in FIGS. 5 and 6B, a front end portion of a second support bracket 100 extending in the longitudinal direction is connected to the attachment piece 93 of the rear shoe 90 in such a way as to be able to turn around the axis extending in the lateral direction of the vehicle. The second support bracket 100 is disposed on the vehicle interior side of the attachment piece 93.

As illustrated in FIG. 7B, a guide pin 101 having the shape of a substantially circular column is provided in a rear upper end portion of the second support bracket 100 in such a way as to protrude toward the vehicle interior side. A leading-in pin 102 having the shape of a substantially circular cylinder is provided in a rear lower end portion of the second support bracket 100 in such a way as to protrude toward the vehicle exterior side. As illustrated in FIG. 11D, the guide pin 101 is inserted into the guide groove 73 of the first support bracket 70 in such a way as to be able to turn and move in a longitudinal direction of the first support bracket 70. When the movable panel 12 is in the fully closed state, the guide pin 101 is positioned in a rear end portion of the guide groove 73.

A rear link 95 is supported by the second upper rail portion 22b of the guide rail 20 in such a way as to be able to move in the longitudinal direction. That is, as illustrated in FIG. 11B, the rear link 95 includes a pair of shoe portions 96 which slide against the vehicle exterior-side portion and the vehicle interior-side portion of the second upper rail portion 22b, respectively. The rear link 95 includes lift levers 97 having a substantially bow shape, rear end portions of which are respectively connected to both the shoe portions 96 in such a way that the lift levers 97 are capable of turning around the axis extending in the lateral direction of the vehicle. Both the lift levers 97 are integrally connected together with the rear guide member 80 being interposed therebetween in the lateral direction of the vehicle. The rear shoe 95 moves in the longitudinal direction while both the shoe portions 96 slide against the vehicle exterior-side portion and the vehicle interior-side portion of the second upper rail portion 22b, respectively.

Figure 11A:
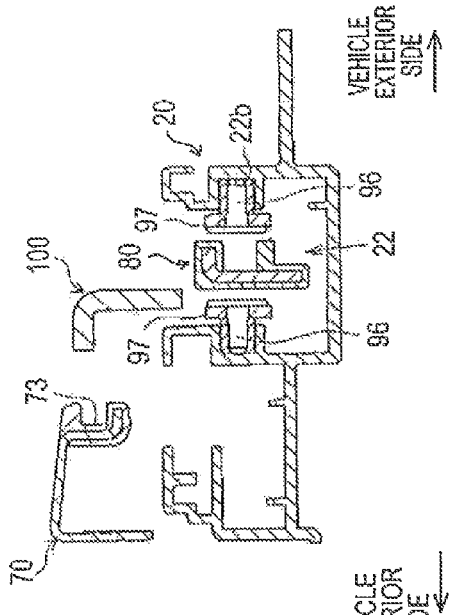
FIGS. 11A, 11B, 11C, and 11D respectively illustrate sectional views of the roof apparatus taken along lines XIA-XIA, XIB-XIB, XIC-XIC, and XID-XID in FIG. 7.
Figure 11B:
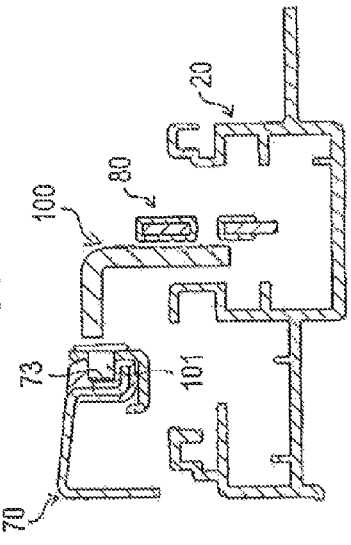
Figure 11C:
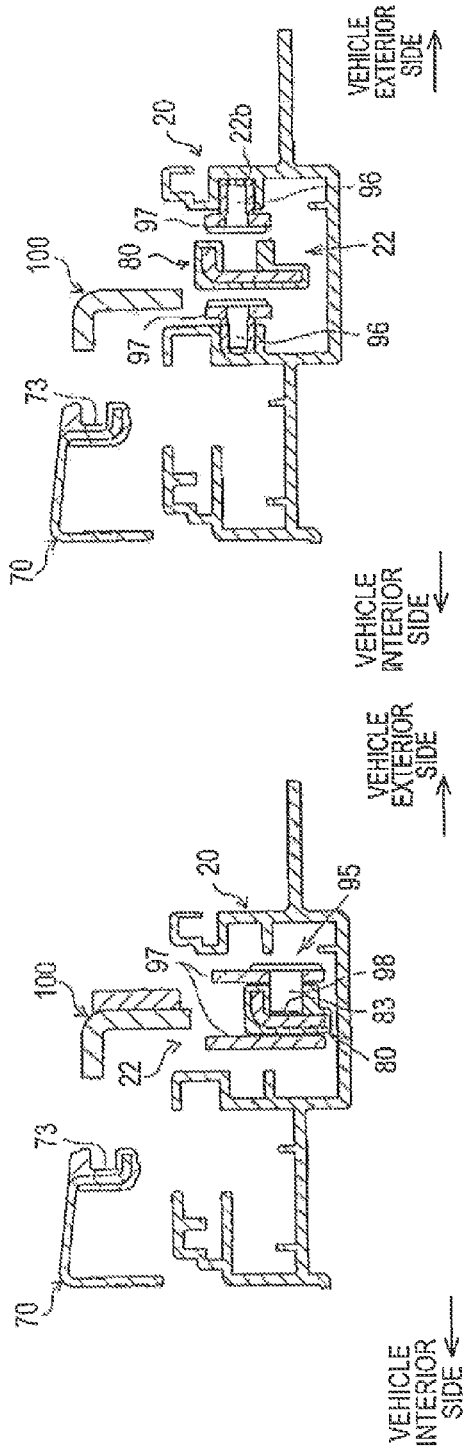
Figure 11D:
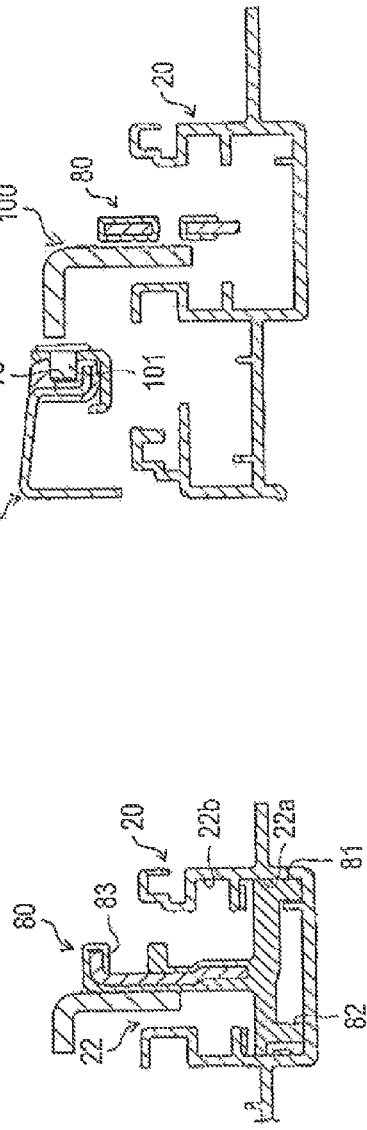
Figure 14A:
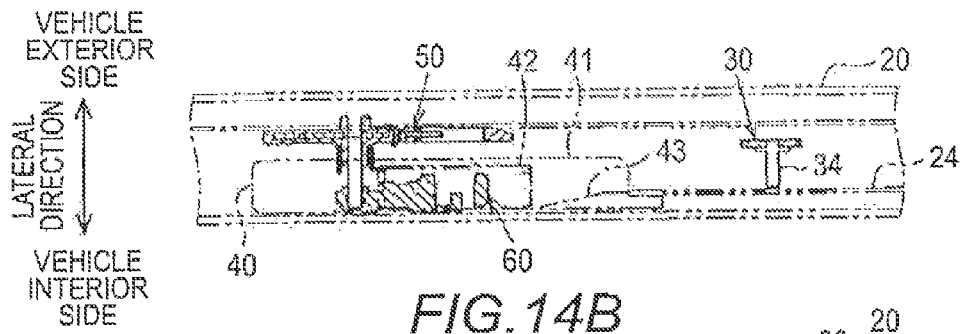
FIGS. 14A and 14B respectively show a top view and a side view illustrating the vehicle interior-side structure of the guide rail in the first tilted up state in the embodiment.
Figure 14B:
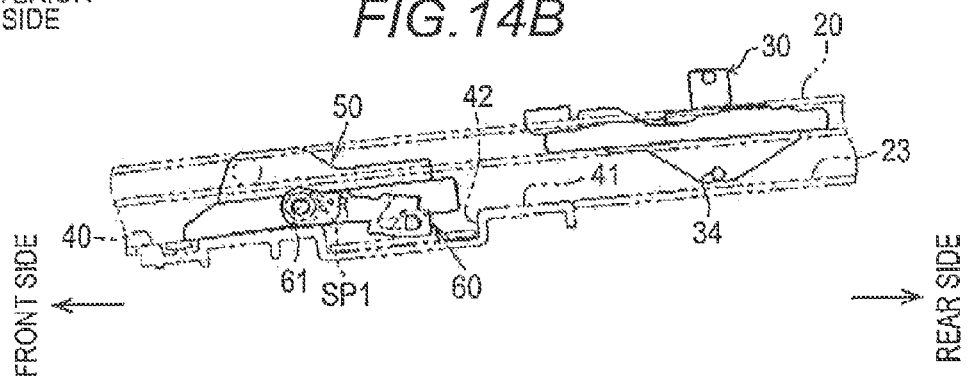
Figure 15A:
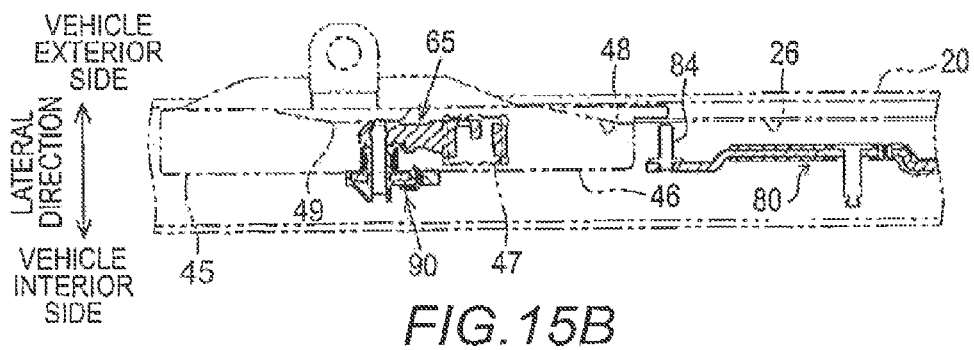
FIGS. 15A and 15B respectively show a top view and a side view illustrating the vehicle exterior-side structure of the guide rail in the first tilted up state in the embodiment.
Figure 15B:
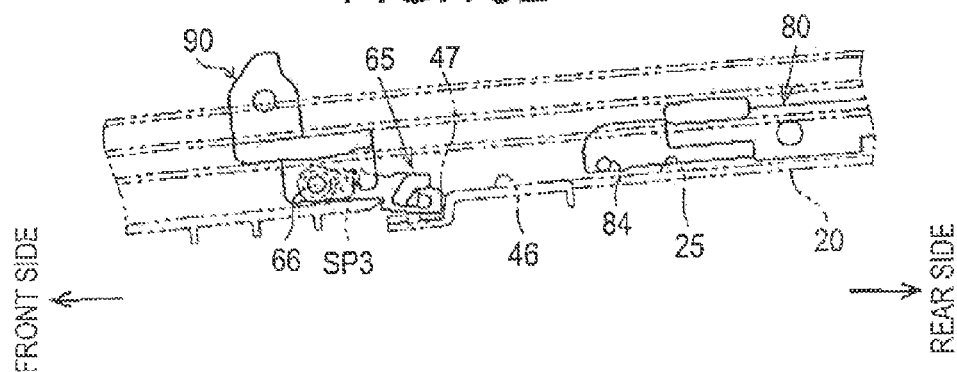

As illustrated in FIG. 11A, a guide pin 98 having the shape of a substantially circular column is provided in a longitudinal intermediate portion of the vehicle exterior-side lift lever 97 in such a way that the guide pin 98 protrudes toward the vehicle interior side, and is inserted into the rear guide groove 83 of the rear guide member 80. Tip end portions (which are positioned higher than the second rail portion 22) of both the lift levers 97 are connected to the longitudinal intermediate portion of the second support bracket 100 in such a way that both the lift levers 97 are capable of turning around the axis extending in the lateral direction of the vehicle.

When the movable panel 12 is in the fully closed state, the guide pin 98 of the rear link 95 is positioned in a front end portion of the rear guide groove 83. Accordingly, when the rear guide member 80 moves to the front of the vehicle relative to the rear link 95, both the lift levers 97 turn in the clockwise direction (illustrated), that is, in a direction in which portions of the lift levers 97 connected to the second support bracket 100 are raised, while the guide pin 98 ascends along the rear guide groove 83. At this time, the second support bracket 100 turns in the counter-clockwise direction (illustrated) pivotally to a portion of the second support bracket 100 connected to the rear shoe 90 (the attachment piece 93), that is, in a direction in which the rear end portion (the guide pin 101) of the second support bracket 100 is raised. The first support bracket 70 lifted up by the guide pin 101 turns in the counter-clockwise direction (illustrated) pivotally to the guide pin 72, that is, in a direction in which a rear end portion of the first support bracket 70 is raised.

Hereinafter, an operation in the embodiment will be described. First, the description will be given on the condition that the movable panel 12 is in the fully closed state as illustrated in FIGS. 6A and 6B to 9A and 9B. At this time, the first rotating check 60 biased by the coil spring SP1 is present at the limiting position in which the head portion 62 of the first rotating check 60 is inserted into the first engaging recessed portion 42 of the first check block 40. The longitudinal movement of the front shoe 50 (which is connected to the first rotating check 60) relative to the guide rail 20 is limited. Similarly, the second rotating check 65 biased by the coil spring SP3 is present at the limiting position in which the head portion 67 of the second rotating check 65 is inserted into the second engaging recessed portion 47 of the second check block 45. The longitudinal movement of the rear shoe 90 (which is connected to the second rotating check 65) and the second support bracket 100 relative to the guide rail 20 is limited. Since the roller 52 of the front shoe 50 is positioned on the upper end of the arm portion 57, the turning of the front link 55 around the guide pin 72 is limited. In addition, since the bent portion 58 is inserted into the first engaging recessed portion 42 of the first check block 40 while the guide pin 72 is positioned at the front end of the front guide groove 28, the longitudinal movement of the front link 55, the first support bracket 70, and the movable panel 12 relative to the guide rail 20 is limited.

In contrast, the engaging and disengaging pin 36 is disposed at the lower end of the engaging groove 88 of the check member 85, and the driving shoe 30 is capable of moving integrally with the check member 85 and the rear guide member 80 in the longitudinal direction. At this time, since the guide pin 98 of the rear link 95 is disposed at the front end of the rear guide groove 83, and the rear link 95 is in a relatively forward tilted position, the second support bracket 100 connected to the rear link 95 is in a relatively rearward tilted position, and the first support bracket 70 (the guide groove 73 of which is supported by the guide pin 101) and the movable panel 12 are in a relatively rearward tilted position. The first groove portion 63a of the first rotating check 60 is positioned on the longitudinal movement locus of the first engaging protrusion 34 along the guide rail 20, and opens to the rear side. Similarly, the first groove portion 68a of the second rotating check 65 is positioned on the longitudinal movement locus of the second engaging protrusion 84 along the guide rail 20, and opens to the rear side.

When the driving shoe 30 moves to the front of the vehicle along the guide rail 20 in this state, while approaching the second rotating check 65 and the like, the driving shoe 30 moves to the front of the vehicle relative to the second support bracket 100 along with the check member 85 and the rear guide member 80, the longitudinal movement of which is limited by the second rotating check 65. At this time, a portion of the rear link 95 connected to the second support bracket 100 is raised while the guide pin 98 ascends to an intermediate portion of the rear guide groove 83 along the rear guide groove 83. Accordingly, as illustrated in FIGS. 12A and 12B and 13A and 13B, the second support bracket 100 turns in such a way that the rear end portion (the guide pin 101) of the second support bracket 100 is raised pivotally to the front end portion of the second support bracket 100. The first support bracket 70 turns in such a way that a rear end portion of the first support bracket 70 is raised relative to the guide pin 72. As a result, the movable panel 12 supported by the first support bracket 70 is tilted upward (first titled up state).

As illustrated in FIGS. 14A and 14B and 15A and 15B, at this stage, the first engaging protrusion 34 of the driving shoe 30 and the second engaging protrusion 84 of the rear guide member 80 have not reached yet the first rotating check 60 and the second rotating check 65, respectively. Accordingly, when the driving shoe 30 moves to the rear of the vehicle along the guide rail 20 in this state, while moving away from the second rotating check 65 and the like, the drive shoe 30 moves to the rear of the vehicle relative to the second support bracket 100 along with the check member 85 and the rear guide member 80, the longitudinal movement of which is limited by the second rotating check 65. At this time, the portion of the rear link 95 connected to the second support bracket 100 is lowered while the guide pin 98 descends to the front end of the rear guide groove 83 along the rear guide groove 83. Accordingly, as illustrated in FIGS. 6A, 6B, 7A, and 7B, the second support bracket 100 turns in such a way that the rear end portion (the guide pin 101) of the second support bracket 100 is lowered pivotally to the front end portion of the second support bracket 100. The first support bracket 70 turns in such a way that the rear end portion of the first support bracket 70 is lowered relative to the guide pin 72. As a result, the movable panel 12 supported by the first support bracket 70 is brought into the fully closed state.

When the driving shoe 30 further moves to the front of the vehicle along with the check member 85 and the rear guide member 80 after the transition of the movable panel 12 into the first tilted up state, the portion of the rear link 95 connected to the second support bracket 100 is raised while the guide pin 98 ascends further to the rear end of the rear guide groove 83 along the rear guide groove 83. Accordingly, as illustrated in FIGS. 16A and 16B and 17A and 17B, the second support bracket 100 turns in such a way that the rear end portion (the guide pin 101) of the second support bracket 100 is further raised pivotally to the front end portion of the second support bracket 100. The first support bracket 70 turns in such a way that the rear end portion of the first support bracket 70 is further raised relative to the guide pin 72. As a result, the movable panel 12 supported by the first support bracket 70 is further tilted upward (a second tilted up state).

At this time, the first engaging protrusion 34 of the driving shoe 30 enters the first groove portion 63a of the first engaging groove 63, and starts to press the front end of the first groove portion 63a (upper end of the second groove portion 63b). Accordingly, the pressing force of the first engaging protrusion 34 is applied to an inclined portion of the second groove portion 63b such that the first rotating check 60 turns against the biasing force of the coil spring SP1. The head portion 62 of the first rotating check 60 moves out of the first engaging recessed portion 42 of the first check block 40, and the first rotating check 60 is capable of moving to the front of the vehicle along with the front shoe 50. Since the first engaging groove 63 (the second groove portion 63b) of the first rotating check 60 is pressed by the first engaging protrusion 34, when the driving shoe 30 moves further to the front of the vehicle along with the check member 85 and the rear guide member 80, as illustrated in FIGS. 17A and 17B, the first rotating check 60 along with the front shoe 50 moves to the front of the vehicle. At this time, the head portion 62 of the first rotating check 60, which has moved out of the first engaging recessed portion 42, is biased by the coil spring SP1, and comes into contact with the bottom wall 41, and the first engaging protrusion 34 in the first engaging groove 63 comes into contact with the lower end of the second groove portion 63b (front end of the third groove portion 63c). The head portion 62 of the first rotating check 60 is biased by the coil spring SP1, and comes into contact with a vehicle interior-side portion of the first lower rail portion 21a. The head portion 62 is positioned relatively away from the front shoe 50 in the lateral direction of the vehicle.

At the same time, the second engaging protrusion 84 of the rear guide member 80 enters the first groove portion 68a of the second engaging groove 68, and starts to press the front end of the first groove portion 68a (upper end of the second groove portion 68b). Accordingly, the pressing force of the second engaging protrusion 84 is applied to an inclined portion of the second groove portion 68b such that the second rotating check 65 turns against the biasing force of the coil spring SP3. The head portion 67 of the second rotating check 65 moves out of the second engaging recessed portion 47 of the second check block 45, and the second rotating check 65 is capable of moving to the front of the vehicle along with the rear shoe 90. Since the second engaging groove 68 (the second groove portion 68b) of the second rotating check 65 is pressed by the second engaging protrusion 84, when the driving shoe 30 moves further to the front of the vehicle along with the check member 85 and the rear guide member 80, as illustrated in FIGS. 18A and 18B, the second rotating check 65 along with the rear shoe 90 moves to the front of the vehicle. Since the longitudinal movement of the first support bracket 70 is limited by the front link 55 and the like at this stage, the second support bracket 100 moves to the front of the vehicle while the guide pin 101 slides against the guide groove 73. At this time, the head portion 67 of the second rotating check 65, which has moved out of the second engaging recessed portion 47, and has passed by the second block-side limiting wall portion 49, is biased by the coil spring SP3, and comes into contact with the bottom wall 46, and the second engaging protrusion 84 in the second engaging groove 68 comes into contact with the lower end of the second groove portion 68$b$ (front end of the third groove portion 63$c$). The head portion 67 of the second rotating check 65 is biased by the coil spring SP3, and comes into contact with a vehicle exterior-side portion of the second lower rail portion 22$a$. The head portion 67 is positioned relatively away from the rear shoe 90 in the lateral direction of the vehicle.

When the driving shoe 30 moves reversely to the rear of the vehicle after the stopping of the driving shoe 30, the first engaging protrusion 34 freely runs along the third groove portion 63$c$, and comes into contact with the rear end of the third groove portion 63$c$. Since the first engaging protrusion 34 is trapped in the third groove portion 63$c$ at this time, the movement of the first rotating check 60 in the vertical direction of the vehicle, that is, the turning of the first rotating check 60 around the support pin 61 is limited. While the first engaging protrusion 34 runs freely along the third groove portion 63$c$, the driving shoe 30 moves to the rear of the vehicle along with the check member 85 and the rear guide member 80 in a state where the first rotating check 60 and the like stay unmoved. The amount of movement of the driving shoe 30 at this time is small, and the movable panel 12 remains in the second tilted up state.

At the same time, the second engaging protrusion 84 of the rear guide member 80 runs freely along the third groove portion 68$c$, and comes into the rear end of the third groove portion 68$c$. Since the second engaging protrusion 84 is trapped in the third groove portion 68$c$ at this time, the movement of the second rotating check 65 in the vertical direction of the vehicle, that is, the turning of the second rotating check 65 around the support pin 66 is limited.

Figure 19A:
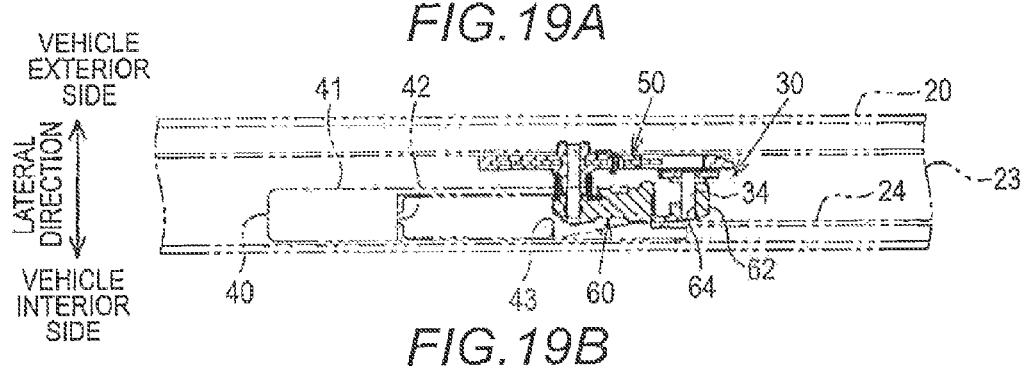
FIGS. 19A and 19B respectively show a top view and a side view illustrating the vehicle interior-side structure of the guide rail when the opening of a moving panel from the second tilted up state is started in the embodiment.
Figure 19B:
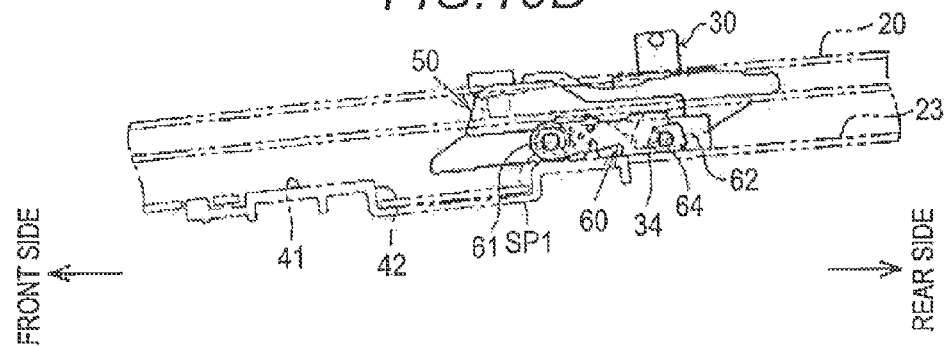

When the driving shoe 30 moves further to the rear of the vehicle along the guide rail 20 in this state, the first rotating check 60, the turning of which is limited by the first engaging protrusion 34 trapped in the third groove portion 63$c$, is pressed by the first engaging protrusion 34, and moves to the rear of the vehicle along with the front shoe 50. The head portion 62 passes through the first engaging recessed portion 42 while not being inserted into the first engaging recessed portion 42. Accordingly, as illustrated in FIGS. 19A and 19B, the head portion 62 of the first rotating check 60 passes by the first block-side limiting wall portion 43, and reaches the first limiting wall portion 24 of the guide rail 20. Since the head portion 62 is guided by the first block-side limiting wall portion 43 when the head portion 62 passes by the first block-side limiting wall portion 43, the first rotating check 60 moves close to the front shoe 50 (and the driving shoe 30) against the biasing force of the coil spring SP1 in the lateral direction of the vehicle (toward the vehicle exterior side). Since the first rotating check 60, which has passed by the first block-side limiting wall portion 43 comes into contact with the first limiting wall portion 24 of the guide rail 20, the position of the first rotating check 60 close to the front shoe 50 (and the driving shoe 30) in the lateral direction of the vehicle is maintained. The first engaging protrusion 34 positioned at the rear end (the insertion recessed portion 64) of the third groove portion 63$c$ moves to the vehicle exterior side of the first rotating check 60, and is inserted into the insertion recessed portion 64. Accordingly, the longitudinal movement of the first rotating check 60 relative to the driving shoe 30 is limited.

Figure 20A:
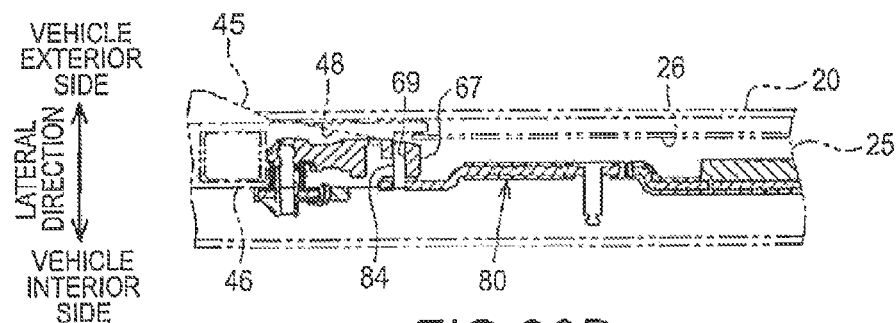
FIGS. 20A and 20B respectively show a top view and a side view illustrating the vehicle exterior-side structure of the guide rail when the opening of the moving panel from the second tilted up state is started in the embodiment.
Figure 20B:
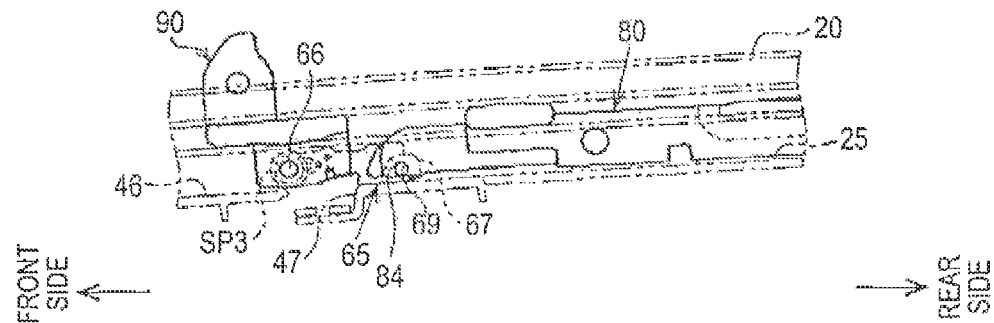
Figure 25A:
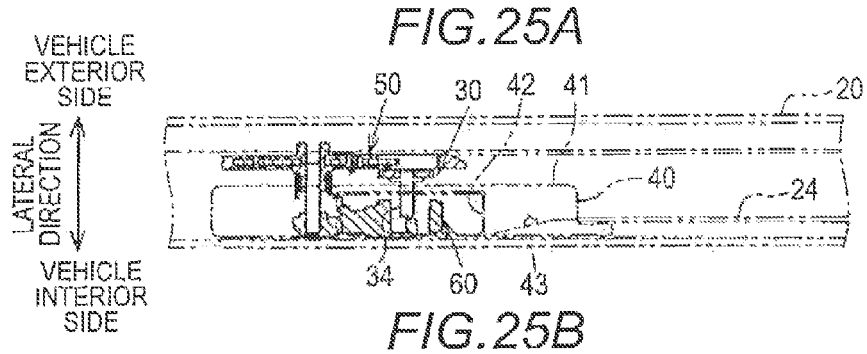
FIGS. 25A and 25B respectively show a top view and a side view illustrating the vehicle inter side structure of the guide rail in the second tilted up state in the embodiment.
Figure 25B:
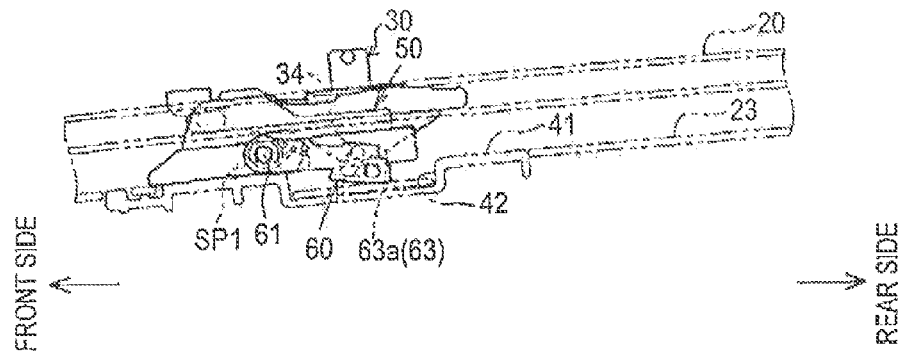
Figure 26A:
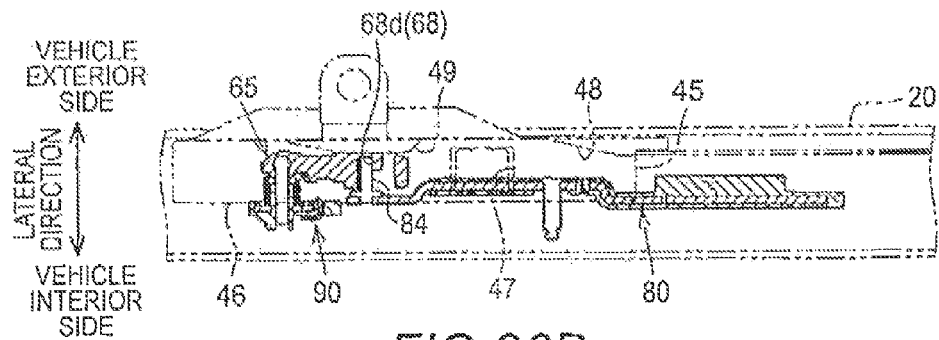
FIGS. 26A and 26B respectively show a top view and a side view illustrating the vehicle exterior-side structure of the guide rail in the second tilted up state in the embodiment.
Figure 26B:
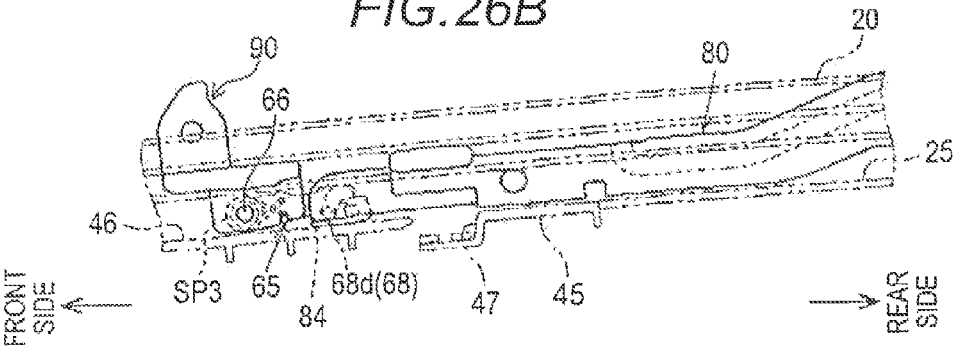

At the same time, the second rotating check 65, the turning of which is limited by the second engaging protrusion 84 trapped in the third groove portion 68$c$, is pressed by the second engaging protrusion 84, and moves to the rear of the vehicle along with the rear shoe 90. The head portion 67 passes through the second engaging recessed portion 47 while not being inserted into the second engaging recessed portion 47. Accordingly, as illustrated in FIGS. 20A and 20B, the head portion 67 of the second rotating check 65 passes by the second block-side limiting wall portions 49 and 48, and reaches the second limiting wall portion 26 of the guide rail 20. Since the head portion 67 is guided by the second block-side limiting wall portion 49 when the head portion 67 passes by the second block-side limiting wall portion 49, the second rotating check 65 moves close to the rear shoe 90 (and the rear guide member 80) against the biasing force of the coil spring SP3 in the lateral direction of the vehicle (toward the vehicle interior side). Subsequently, since the second rotating check 65 is guided by an inclined rear end portion of the second block-side limiting wall portion 49, due to the biasing force of the coil spring SP3, the second rotating check 65 moves away from the rear shoe 90 (and the rear guide member 80) in the lateral direction of the vehicle (toward the vehicle exterior side). Since the head portion 57 is guided by the second block-side limiting wall portion 48, the second rotating check 65 moves close to the rear shoe 90 (and the rear guide member 80) against the biasing force of the coil spring SP3 in the lateral direction of the vehicle (toward the vehicle interior side). Since the second rotating check 65, which has passed by the second block-side limiting wall portion 48 comes into contact with the second limiting wall portion 26 of the guide rail 20, the position of the second rotating check 65 close to the rear shoe 90 (and the rear guide member 80) in the lateral direction of the vehicle is maintained. The second engaging protrusion 84 positioned at the rear end (the insertion recessed portion 69) of the third groove portion 68$c$ moves to the vehicle interior side of the second rotating check 65, and is inserted into the insertion recessed portion 69. Accordingly, the longitudinal movement of the second rotating check 65 relative to the driving shoe 30 is limited.

As described above, the first rotating check 60 and the front shoe 50 are capable of moving integrally with the driving shoe 30 in the longitudinal direction. The second rotating check 65, the rear shoe 90, and the second support bracket 100 are capable of moving integrally with the driving shoe 30 in the longitudinal direction.

As illustrated in FIGS. 29A to 29C, when the front shoe 50 moves to the rear of the vehicle along with the driving shoe 30 and the like, the shoe-side guide wall 53 presses the link-side guide wall 57$b$ of the front link 55 positioned on the movement locus of the front link 55, and thus the front link 56 turns in such a way that a rear end portion (the engaging groove 57$a$) of the front link 55 is raised pivotally to the guide pin 72. At this time, the roller 52 of the front shoe 50 approaches an open end of the engaging groove 57$a$. When the front shoe 50 moves to the rear of the vehicle in this state, the roller 52 enters the engaging groove 57$a$ while the front link 55 turns such that the rear end portion (the engaging groove 57a) of the front link 55 is raised pivotally to the guide pin 72. As such, the reason the shoe-side guide wall 53 expedites the turning of the front link 55 by pressing the link-side guide wall 57b is that even though a rear end of the engaging groove 57a is not disposed at a slightly higher position, the roller 52 is allowed to more reliably enter the engaging groove 57a.

The turning of the front link 55 due to the roller 52 entering the engaging groove 57a causes the bent portion 58 to move out of the first engaging recessed portion 42 of the first check block 40, and thus the front link 55 is capable of moving to the rear of the vehicle along with the first support bracket 70. Accordingly, the movement of the front link 55 to the rear of the vehicle along with the front shoe 50 and the like in this state causes the guide pin 72 to ascend along the front guide groove 28 of the front guide member 27. The front link 55 moves along with the first support bracket 70 in the rearward direction while the guide pin 72 entering the first upper rail portion 21b from the front guide groove 28 moves to the rear of the vehicle along the first upper rail portion 21b. At this time, the second support bracket 100 moves to the rear of the vehicle along with the rear shoe 90 and the like.

Accordingly, the first support bracket 70 and the second support bracket 100 move to the rear of the vehicle while the longitudinal distance therebetween maintains constant. Accordingly, the movable panel 12 moves to the rear of the vehicle while maintaining the second tilted up state (opening operation). In other words, until the front link 55 is capable of moving to the rear of the vehicle along with the first support bracket 70, the second support bracket 100 moves to the rear of the vehicle along with the rear shoe 90 and the like, but the first support bracket 70 remains stopped even though the front shoe 50 moves to the rear of the vehicle. At this time, since the second support bracket 100 moves to the rear of the vehicle while the guide pin 101 slides against the guide groove 73, the movable panel 12 continues to maintain the second tilted up state.

Thereafter, as illustrated in FIGS. 21A and 21B, the amount of movement of the driving shoe 30 to the rear of the vehicle exceeds a predetermined amount, and the limiting portion 89 of the check member 85, which has moved to the rear of the vehicle along with the driving shoe 30, reaches the limiting hole 25a formed in the bottom wall 25 of the guide rail 20. At this time, the driving shoe 30 turns the check member 85 biased by the coil spring SP2 its order for the limiting portion 89 to be inserted into the limiting hole 25a, and disengages the engaging and disengaging pin 36 from the engaging groove 88. Accordingly, the driving shoe 30 is capable of moving to the rear of the vehicle while the check member 85 stays unmoved, and the check member 85 is stopped at this position along with the second support bracket 100 and the like. Even in this state, the first support bracket 70 is supported through the guide groove 73 by the guide pin 101 of the second support bracket 100 in such a way as to be able to move in the longitudinal direction.

Accordingly, when the driving shoe 30 moves further to the rear of the vehicle, the first support bracket 70 moves to the rear of the vehicle by the intervention of the first rotating check 60 and the like. The longitudinal distance between the first support bracket 70 and the second support bracket 100 is reduced at this time; however, since the guide groove 73 slides against the guide pin 101, as illustrated in FIGS. 22A and 22B, while maintaining the second tilted up state, the movable panel 12 moves to the rear of the vehicle until the movable panel 12 transitions into the fully open state (opening operation).

When the driving shoe 30 moves to the front of the vehicle in the fully open state of the movable panel 12, the movable panel 12 moves to the front of the vehicle while maintaining the second tilted up state (closing operation). When the engaging and disengaging pin 36 of the driving shoe 30 reaches the engaging groove 88 of the check member 85, the driving shoe 30 turns the check member 85 against the biasing force of the coil spring SP2 in order for the limiting portion 89 to move out of the limiting hole 25a, and engages the engaging and disengaging pin 36 into the engaging groove 88.

Accordingly, when the driving shoe 30 moves further to the front of the vehicle, the second support bracket 100 starts to move to the front of the vehicle by the intervention of the check member 85, the second rotating check 65, and the like. The first support bracket 70 and the second support bracket 100 move to the front of the vehicle while the longitudinal distance therebetween maintains constant, and the movable panel 12 moves to the front of the vehicle while maintaining the second tilted up state (closing operation).

When the driving shoe 30 moves further to the front of the vehicle, the guide pin 72 on the vehicle exterior side of the first support bracket 70 enters and descends the front guide groove 28 of the vehicle exterior-side portion of the first upper rail portion 21b, and reaches the front end of the front guide groove 28. At this time, the bent portion 58 of the front link 55 is positioned above the first engaging recessed portion 42 of the first check block 40; however, since the roller 52 of the front shoe 50 is engaged with the engaging groove 57a, the bent portion 58 cannot be inserted into the first engaging recessed portion 42.

When the driving shoe 30 moves further to the front of the vehicle in this state, the front shoe 50 moving further to the front of the vehicle along with the first rotating check 60 turns the front link 55 in a direction in which the rear end portion of the arm portion 57 is lowered pivotally to the guide pin 72, that is, in a direction in which the bent portion 58 is inserted into the first engaging recessed portion 42, and the front shoe 50 lifts up the roller 52 to the vehicle front side of the engaging groove 57a. Accordingly, the longitudinal movement of the front link 55 and the first support bracket 70 (and the movable panel 12) is limited.

In contrast, the head portion 62 reaches the first check block 40, and the first rotating check 60, which is biased by the coil spring SP1 in the lateral direction of the vehicle, moves away from the front shoe 50 (and the driving shoe 30) in the lateral direction of the vehicle, but within a limiting range defined by the first block-side limiting wall portion 43. At this time, due to the movement of the first rotating check 60 in the lateral direction of the vehicle, the first engaging protrusion 34 inserted into the insertion recessed portion 64 moves out of the insertion recessed portion 64. Accordingly, the first engaging protrusion 34 (the driving shoe 30) is capable of moving to the front of the vehicle relative to the first rotating check 60. At the same time, the head portion 62 of the first rotating check 60 is disposed above the first engaging recessed portion 42 of the first check block 40. At this stage, the first engaging protrusion 34 is positioned at the rear end of the third groove portion 63c, and the movement of the first rotating check 60 in the vertical direction of the vehicle, that is, the turning of the first rotating check 60 around the support pin 61 remains limited as in the aforementioned state. When the driving shoe 30 moves further to the front of the vehicle in this state, the first engaging protrusion 34 comes into contact with the front end of the third groove portion 63*c* (the lower end of the second groove portion 63*b*) while freely running along the third groove portion 63*c*. Even at this stage, since the first engaging protrusion 34 is positioned at the lower end of the second groove portion 63*b* inclined, the turning of the first rotating check 60 around the support pin 61 remains limited.

The ECU performs control such that the movement of the driving shoe 30 to the front of the vehicle is stopped at this stage. The head portion 67 reaches the second check block 45, and the second rotating check 65, which is biased by the coil spring SP3 in the lateral direction of the vehicle, moves away from the rear shoe 90 (and the rear guide member 80) in the lateral direction of the vehicle, but within a limiting range defined by the second block-side limiting wall portion 48. At this time, due to the movement of the second rotating check 65 in the lateral direction of the vehicle, the second engaging protrusion 84 inserted into the insertion recessed portion 69 moves out of the insertion recessed portion 69. Accordingly, the second engaging protrusion 84 (the rear guide member 80) is capable of moving to the front of the vehicle relative to the second rotating check 65. At this stage, the second engaging protrusion 84 is positioned at the rear end of the third groove portion 68*c*, and the movement of the second rotating check 65 in the vertical direction of the vehicle, that is, the turning of the second rotating check 65 around the support pin 66 remains limited as in the aforementioned state. When the rear guide member 80 moves further to the front of the vehicle in this state, the second engaging protrusion 84 comes into contact with the front end of the third groove portion 68*c* (the lower end of the second groove portion 68*b*) while freely running along the third groove portion 68*c*. Even at this stage, since the second engaging protrusion 84 is positioned at the lower end of the second groove portion 68*b* inclined, the turning of the second rotating check 65 around the support pin 66 remains limited. When the rear guide member 80 moves further to the front of the vehicle, the head portion 67 of the second rotating check 65 passes through the second engaging recessed portion 47 of the second check block 45, and is disposed on the bottom wall 25 on the vehicle front side of the second engaging recessed portion 47. At this time, since the head portion 67 of the second rotating check 65 is aligned with the longitudinal position of the second block-side limiting wall portion 49, the second rotating check 65 moves close to the rear shoe 90 (and the rear guide member 80) in the lateral direction of the vehicle in a state where the second engaging protrusion 84 is positioned at the lower end (the pressed surface 88*d*) of the second groove portion 68*b*. When the second engaging protrusion 84 moves to the rear of the vehicle in this state, the second rotating check 65 integrally with the second engaging protrusion 84 moves to the rear of the vehicle with the pressed surface 68*d* of the second rotating check 65 being pressed, and the second engaging protrusion 84 does not pass through the third groove portion 68*c*, and does not reach the insertion recessed portion 69.

When the driving shoe 30 reversely moves to the rear of the vehicle after the stopping of the driving shoe 30 in the aforementioned state, as illustrated in FIGS. 23A and 23B to 26A and 26B, the first rotating check 60 biased by the coil spring SP1 turns around the support pin 61 while the first engaging protrusion 34 moves out of the second groove portion 63*b* along the second groove portion 63*b*, and the head portion 62 of the first rotating check 60 is inserted into the first engaging recessed portion 42 of the first check block 40. Accordingly, the longitudinal movement of the first rotating check 60 and the front shoe 50 relative to the guide rail 20 is limited. At the same time, the vehicle rear side of the first groove portion 63*a* of the first rotating check 60 opens along the guide rail 20 for the first engaging protrusion 34.

The second engaging protrusion 84 is positioned at the lower end (the pressed surface 68*d*) of the second groove portion 68*b*, and the pressed surface 68*d* is pressed by the second engaging protrusion 84 such that the second rotating check 65 integrally with the second engaging protrusion 84 moves to the rear of the vehicle. Accordingly, when the head portion 67 passes by the second block-side limiting wall portion 49, and reaches a position above the second engaging recessed portion 47, the second rotating check 65 biased by the coil spring SP3 turns around the support pin 66 while the second engaging protrusion 84 moves out of the second groove portion 68*b* along the second groove portion 68*b*, and the head portion 67 of the second rotating check 65 is inserted into the second engaging recessed portion 47 of the second check block 45. Accordingly, the longitudinal movement of the second rotating check 65 and the rear shoe 90 (and the second support bracket 100) relative to the guide rail 20 is limited. At the same time, the vehicle rear side of the first groove portion 68*a* of the second rotating check 65 opens along the guide rail 20 for the second engaging protrusion 84.

As described above, even after the longitudinal movement of the first support bracket 70 is limited, the second support bracket 100 moves to the rear of the vehicle along with the second rotating check 65 and the like until the head portion 67 of the second rotating check 65 is inserted into the second engaging recessed portion 47. However, since the amount of movement is small, and during the movement, the guide pin 101 of the second support bracket 100 merely slides against the guide groove 73 of the first support bracket 70, there is almost no actual impact of the movement on the positions of the first support bracket 70 and the movable panel 12. The reason the head portion 67 is inserted into the second engaging recessed portion 47 along with the movement of the second rotating check 65 and the like to the rear of the vehicle is that the head portion 67 of the second rotating check 65 (which has a longitudinal dimension set to be equal to the longitudinal opening width of the first engaging recessed portion 42) is more reliably inserted into the second engaging recessed portion 47.

As described above, when the driving shoe 30 moves further the rear of the vehicle along the guide rail 20 along with the check member 85 and the rear guide member 80 in a state where the longitudinal movement of the first support bracket 70 and the second support bracket 100 is limited, the rear link 95 lowers the portion of the rear link 96 connected to the second support bracket 100 while lowering the guide pin 93 along the rear guide groove 83. Accordingly, the second support bracket 100 turns in such a way that the rear end portion (the guide pin 101) of the second support bracket 100 is lowered pivotally to the front end portion of the second support bracket 100, and the first support bracket 70 turns in such a way that the rear end portion of the first support bracket 70 is lowered pivotally to the guide pin 72. As illustrated in FIGS. 6A, 6B, 7A, and 7B, the movable panel 12 supported by the first support bracket 70 is tilted downward, and transitions into (returns to) the fully closed state through the first tilted up state. The ECU performs control such that the movement of the driving shoe 30 to the rear of the vehicle is stopped.

When the movable panel 12 transitions into the fully closed state while being tilted downward, the lead-in pin 102 of the second support bracket 100 descends gradually. In contrast, the leading-in portion 80*a* of the rear guide member 80 gradually moves to the rear of the vehicle, that is, in an open direction. Accordingly, as the leading-in portion 80*a* moves the rear of the vehicle, the leading-in portion 80*a* guides the leading-in pin 102 which is being lowered, and thus the engagement of the leading-pin 102 is performed such that the movable panel 12 is led into the fully closed state.

As described above in detail, according to the embodiment, the following effects can be obtained.

(1) In the embodiment, when the driving shoe 30 moves to the front of the vehicle relative to the first support bracket 70 and the second support bracket 100 along with the check member 85 and the like in the fully closed state of the movable panel 12, the movable panel 12 transitions into a tilted up state. When the driving shoe 30 moves further to the front of the vehicle in the tilted up state, and then moves to the rear of the vehicle, the driving shoe 30 is engaged with the front link 55, and moves along with the front link 55, and the movable panel 12 is being opened while being in the tilted up state. When the amount of movement of the driving shoe 30 to the rear of the vehicle exceeds the predetermined amount, the driving shoe 30 is disengaged from the check member 85 and the like. Accordingly, the driving shoe 30 moves to the rear of the vehicle along with the front link 55 while the check member 85 and the like stay unmoved, and while being in the titled up state, the movable panel 12 is being opened until the movable panel 12 transitions into the fully open state. The maximum amount of movement of the driving shoe 30 used to define the fully open state of the movable panel 12 is not limited by the amount of movement of the driving shoe 30 in a reverse direction (to the front of the vehicle) required to bring the movable panel 12 into the tilted up state. As a result, it is possible to increase the maximum amount of movement of the driving shoe 30 used to define the fully open state of the movable panel 12, that is, the opening area of the movable panel 12.

(2) In the embodiment, when the movable panel 12 is in the fully closed state, the longitudinal movement of the front link 55 along the guide rail 20 is limited, and the movement of the front shoe 50 is limited by the first rotating check 60. Accordingly, when the driving shoe 30 moves to the front of the vehicle for the transition of the movable panel 12 into the tilted up state, the movement of the front end portion of the first support bracket 70 is limited. In the tilted up state, the first rotating check 60, the first engaging groove 63 of which is pressed by the first engaging protrusion 34 when the driving shoe 30 moves further to the front of the vehicle, releases the limitation to the movement of the front shoe 50. Thereafter, the first rotating check 60 is engaged with the first engaging protrusion 34 such that the front shoe 50 moves integrally with the driving shoe 30 when the driving shoe 30 moves to the rear of the vehicle. Accordingly, since the front shoe 50 moves to the rear of the vehicle relative to the front link 55, and is engaged with the front link 55, the front shoe 50 and the front link 55 integrally move to the rear of the vehicle along with the front end portion of the first support bracket 70. As such, in the tilted up state, even though the front shoe 50 moves to the front of the vehicle along with the driving shoe 30 so as to release the limitation to the movement of the front shoe 50, the front shoe 50 is not engaged with the front link 55 unless the front shoe 50 moves to the rear of the vehicle relative to the front link 55. For this reason, it is possible to more reliably limit the movement of the front link 55 and the front end portion of the first support bracket 70.

(3) In the embodiment, when the movable panel 12 is in the fully closed state, the movement of the rear shoe 90 is limited by the second rotating check 65, thereby limiting the movement of the front end portion of the second support bracket 100 when the driving shoe 30 moves to the front of the vehicle along with the rear guide member 80 and the like for the transition of the movable panel 12 into the tilted up state. In the tilted up state, when the driving shoe 30 moves the front of the vehicle along with the rear guide member 80 and the like, the limitation to the movement of the rear shoe 90 is released by the second rotating check 65, the second engaging groove 68 of which is pressed by the second engaging protrusion 84. Thereafter, the second rotating check 65 is engaged with the second engaging protrusion 84 such that the rear shoe 90 moves integrally with the driving shoe 30 when the driving shoe 30 moves to the rear of the vehicle along the rear guide member 80 and the like. Accordingly, the rear shoe 90 integrally with the front end portion of the second support bracket 100 moves to the rear of the vehicle. In the tilted up state, when the rear shoe 90 moves to the front of the vehicle along with the driving shoe 30, the rear guide member 80, and the like so as to release the limitation to the movement of the rear shoe 90, the front end portion of the second support bracket 100 also moves to the front of the vehicle. However, the support position of the second support bracket 100 for the first support bracket 70 is moved to the front of the vehicle relative to the first support bracket 70, and thus it is possible to suppress the movement of the front end portion of the first support bracket 70.

(4) In the embodiment, when the driving shoe 30 moves to the front of the vehicle so as to close the movable panel 12 from an open state, the front link 55 moving to the front of the vehicle along with the front shoe 50 and the first rotating check 60 switches into a limited state, and thus the movement of the front end portion of the first support bracket 70 is limited. When the front shoe 50 and the first rotating check 60 move to the front of the vehicle relative to the front link 55, the first rotating check 60 reaches the first engaging recessed portion 42, and is inserted into the first engaging recessed portion 42, and the driving shoe 30 is allowed to move to the rear of the vehicle relative to the front shoe 50. In contrast, when the driving shoe 30 moves to the front of the vehicle so as to close the movable panel 12 from an open state, the second rotating check 65 moving to the front of the vehicle along with the check member 85 passes through the second engaging recessed portion 47 at a stage in which the first rotating check 60 reaches the first engaging recessed portion 42. When the driving shoe 30 moves to the rear of the vehicle for the transition of the movable panel 12 into the fully closed state, the second rotating check 65 moving to the rear of the vehicle along with the check member 85 reaches the second engaging recessed portion 47, and is inserted into the second engaging recessed portion 47, and the driving shoe 30 is allowed to move to the rear of the vehicle relative to the rear shoe 90. Accordingly, the driving shoe 30 moves to the rear of the vehicle relative to the first support bracket 70 and the second support bracket 100, and the movable panel 12 transitions into the fully closed state. The movement of the front end portion of the first support bracket 70 is limited, and the front end portion of the second support bracket 100 moves to the rear of the vehicle along with the rear shoe 90 until the second rotating check 65 reaches the second engaging recessed portion 47 after the first rotating check 60 reaches the first engaging recessed portion 42. However, even though the front end portion of the second support bracket 100 moves to the rear of the vehicle, only the support position (the guide pin 101) of the second support bracket 100 for the first support bracket 70 moves, and thus the movement slightly affects or does not affect the position of the first support bracket 70, that is, the position of the movable panel 12. As such, since the second rotating check 65 may be inserted into the second engaging recessed portion 47 while moving to the rear of the vehicle, it is possible to reduce the play of the second rotating check 65 when the second rotating check 65 is inserted into the second engaging recessed portion 47. Accordingly, it is possible to more accurately set a position in which the second rotating check 65 is inserted into the second engaging recessed portion 47, that is, a position in which the tilting down of the movable panel 12 for the transition into the fully closed state is started.

(5) In the embodiment, when the front shoe 50 moves to the rear of the vehicle relative to the front link 55, the turning of the front link 55 to the vicinity of an engagement position is expedited by the shoe side guide wall 53 and the link-side guide wall 57b (both of which form the expediting portion) prior to the engagement between the front link 55 (the engaging groove 57a) and the front shoe 50 (the roller 52). Accordingly, even though a margin in the engagement between the front link 55 and the front shoe 50 in the vertical direction of the vehicle is not sufficiently ensured, the front link 55 can be more reliably engaged with the front shoe 50. As a result, it is possible to reduce the size of the front link 55 or the front shoe 50 in the vertical direction of the vehicle.

(6) In the embodiment, when the predetermined amount is lower than the amount of movement of the driving shoe 30 to the rear of the vehicle after the opening of the movable panel 12 is started while the movable panel 12 is in the tilted up state, both the front link 55 and the rear guide member 80 move to the rear of the vehicle. Accordingly, the longitudinal separation distance between the support position of the guide rail 20 for the front end portion (the guide pin 72) of the first support bracket 70 and the support position of the second support bracket 100 for the first support bracket 70 is maintained constant. As a result, even though the predetermined amount is exceeded by the amount of movement of the driving shoe 30 to the rear of the vehicle after the opening of the movable panel 12 is started while the movable panel 12 is in the tilted up state, and the movable panel 12 transitions into the fully open state while the second support bracket 100 stays unmoved along with the rear guide member 80, it is possible to ensure the separation distance, and to increase support rigidity for the movable panel 12.

When the predetermined amount is exceeded by the amount of movement of the driving shoe 30 to the rear of the vehicle after the opening of the movable panel 12 is started while the movable panel 12 is in the tilted up state, the second support bracket 100 stays unmoved along with the rear guide member 80. For this reason, basically, the required longitudinal dimension of the guide rail 20 may correspond to the movement range of the driving shoe 30 that has moved until the movable panel 12 is brought into the fully open state. Accordingly, it is possible to further reduce the longitudinal dimension of the guide rail 20. Specifically, as illustrated in FIGS. 22A and 22B, when the movable panel 12 is in the fully open state, the rear guide member 80 and the rear link 95, which have stopped in the middle of the opening operation, are positioned closer to the front of the vehicle than the vicinity of a rear end of the front opening 11a, and the driving shoe 30 is also disposed at the same position. As a result, the guide rail 20 may have a longitudinal dimension extending in the vicinity of the rear end of the front opening 11a.

(7) In the embodiment, the longitudinal opening width of the first engaging recessed portion 42 is set to be much greater than the longitudinal dimension of the head portion 62. Accordingly, even though the ECU may cause an error in a timing at which the driving shoe 30 is stopped by the ECU in order for the head portion 62 of the first rotating check 60 to be positioned above the first engaging recessed portion 42 when the driving shoe 30 moves to the front of the vehicle so as to close the movable panel 12 from an open state, the head portion 62 can be more reliably inserted into the first engaging recessed portion 42. The error in the timing is due to variations of the ECU, variations in the position of the joining between the driving shoe 30 and the drive belt 39, or the like. In this case, the longitudinal position of the first support bracket 70 and the like in the fully closed state of the movable panel 12 cannot be determined by the first rotating check 60; however, the position can be determined by the front link 55 without any difficulty.

(8) In the embodiment, when the movable panel 12 transitions from the tilted up state to the fully closed state, the leading-in pin 102 is guided by the leading-in portion 80a that opens in a movement direction (to the rear of the vehicle) of the driving shoe 30. Accordingly, it is possible to more smoothly lead the movable panel 12 into the fully closed state. Particularly, since the rear guide member 80 is disposed close to the rear of the vehicle based on the assumption that the movable panel 12 moves to the front of the vehicle from the fully closed state, or based on the assumption that the rear guide member 80 is connected to the check member 85 so as to stop the movable panel 12 in the middle of the movement, it is possible to form the leading-in portion 80a without uselessly extending the rear guide member 80 in the longitudinal direction. Alternatively, since the movable panel 12 is led into the fully closed state by the intervention of the check member 85 and the rear guide member 80 when the driving shoe 30 moves to the rear of the vehicle, it is possible to increase the degree of freedom in the setting of dispositions and dimensions.

(9) In the embodiment, since it is possible to sufficiently ensure the amount of movement of the driving shoe 30 when the movable panel 12 transitions from the fully closed state to the tilted up state, or from the tilted up state to the fully closed state, it is possible to reduce a load (the output of the motor) per the amount of unit movement of the driving shoe 30, or to prevent an increase in the size of the electric drive source 38.

Particularly, when the apparatus has a function of determining the pinching of the movable panel 12 when a change in the rotational speed of the electric drive source 38 associated with the opening and closing of the movable panel 12 exceeds a predetermined threshold value (hereinafter, which is also referred to as a "reverse load"), and reversely operating the movable panel 12, a change in the rotational speed during a normal operation is small. Accordingly, it is possible to reduce the reverse load. That is, even though the reverse load is reduced, it is possible to less erroneously determine the pinching of the movable panel 12 by virtue of this function. In this case, a reverse load of 100 N or less required by the European regulation may be satisfied, and the automatic closing of the movable panel 12 may be achieved.

(10) In the embodiment, as illustrated in FIGS. 10A and 10D, in the fully closed state of the movable panel 12, when the driving shoe 30 moves in the longitudinal direction so as to be engaged with the first rotating check 60, the driving shoe 30 slides against the first rail portion 21 of the guide rail 20 in a state where the driving shoe 30 bestrides the first rail portion 21 in the lateral direction of the vehicle. However, since the driving shoe 30 slides against the first upper rail portion 21b that is actually positioned higher than the front link 55, the driving shoe 30 does not interfere with the front link 55. Accordingly, the driving shoe 30 and the front link 55 can be disposed in such a way that the longitudinal positions of the driving shoe 30 and the front link 55 overlap with each other in a state where the driving shoe 30 is engaged with the first rotating check 60 (for example, in the fully open state of the movable panel 12), and thus it is possible to further reduce the longitudinal dimension of the guide rail 20 required to include the movement range of the driving shoe 30 and the like.

The following changes may be made to the embodiment.

In the embodiment, when the position of the second support bracket 100 can be controlled by directly connecting the rear guide groove 83 of the rear guide member 80 to the guide pin 101 of the second support bracket 100, the rear link 95 may be omitted.

In the embodiment, the front guide member 27 may be omitted, and the raising of the front end portion of the first support bracket 70 when the opening of the movable panel 12 is started from the tilted up state may be realized by an appropriate structure of the engagement between the front shoe 50 and the first support bracket 70.

In the embodiment, when a margin in the engagement between the front link 55 and the front shoe 50 in the vertical direction of the vehicle can be sufficiently ensured, the shoe-side guide wall 53 and the link-side guide wall 57b (both of which form the expediting portion) may be omitted.

In the embodiment, during the movement of the driving shoe 30 to the front of the vehicle so as to close the movable panel 12 from an open state, the second rotating check 65 (the head portion 67) may reach the second engaging recessed portion 47 when the first rotating check 60 (the head portion 62) reaches the first engaging recessed portion 42. That is, the head portion 67 of the second rotating check 65 may be inserted into the second engaging recessed portion 47 when the head portion 62 of the first rotating check 60 is inserted into the first engaging recessed portion 42. Preferably, the longitudinal opening width of the second engaging recessed portion 47 is set to be sufficiently greater than the longitudinal dimension of the head portion 67 so that the head portion 67 can be more reliably inserted into the second engaging recessed portion 47.

In the embodiment, engagement and disengagement between the rear guide member 80 and the guide rail 20 (the limiting hole 25a) is performed by the intervention of the check member 85 connected to the rear guide member 80; however, when the rear guide member 80 as a rear member can be directly engaged with and be disengaged from the guide rail 20, the check member 85 may be omitted.

In the embodiment, the roof apparatus may include multiple movable panels. For example, the same movable panel as the movable panel 12 may be adopted instead of the fixed panel 13. Hereinafter, supplementary notes regarding technical sprits which can be understood from the embodiment and other examples will be given.

(1) A roof apparatus including: a front link that is engaged with a front shoe such that the front link turns toward a predetermined engagement position; and an expediting portion that is provided between the front link and the front shoe, and expedites the turning of the front link to the vicinity of the engagement position prior to the engagement between the front link and the front shoe when the front shoe moves to the rear of the vehicle relative to the front link.

In this configuration, since the turning of the front link to the vicinity of the engagement position is expedited by the expediting portion prior to the engagement between the front link and the front shoe when the front shoe moves to the rear of the vehicle relative to the front link, even though a margin in the engagement between the front link and the front shoe is not sufficiently ensured, the front link can be more reliably engaged with the front shoe. Accordingly, it is possible to further reduce the size of the front link or the front shoe.

A roof apparatus according to an aspect of this disclosure includes: a front member and a rear member which are supported by a guide rail in such a way as to be able to move in a longitudinal direction of a vehicle and as to be engaged with a driving shoe driven to move in the longitudinal direction of the vehicle along the guide rail; a first support bracket, a front end portion of which is supported by the guide rail and is connected to the front member, and which supports a movable panel; and a second support bracket, a front end portion of which is supported by the guide rail, a portion of which is connected to the rear member with the portion being positioned closer to a rear of the vehicle than the front end portion, and which movably supports the first support bracket. Since the driving shoe is engaged with the rear member and is disengaged from the front member when the movable panel is in a fully closed state, when the driving shoe moves to a front of the vehicle along with the rear member, the second support bracket turns in such a way that a portion of the second support bracket connected to the rear member is raised pivotally to the front end portion of the second support bracket, the first support bracket turns in such a way that a portion of the first support bracket supporting the second support bracket is raised pivotally to the front end portion of the first support bracket, and thus, the movable panel transitions into a tilted up state. Since the driving shoe is engaged with the front member when the driving shoe moves to the rear of the vehicle after moving further to the front of the vehicle in the tilted up state, the driving shoe moves along with the front member, and the movable panel is being opened while being in the tilted up state. When the amount of movement of the driving shoe to the rear of the vehicle exceeds a predetermined amount, the driving shoe is disengaged from the rear member.

In this configuration, when the driving shoe moves to the front of the vehicle along with the rear member relative to the first support bracket and the second support bracket in the fully closed state of the movable panel, the movable panel transitions into the tilted up state. Since the driving shoe is engaged with the front member when the driving shoe moves to the rear after moving further to the front of the vehicle in the tilted up state, the driving shoe moves along with the front member, and the movable panel is being opened while being in the tilted up state. Since the driving shoe is disengaged from the rear member when the amount of movement of the driving shoe to the rear of the vehicle exceeds the predetermined amount, the driving shoe moves to the rear of the vehicle along with the front member while the rear member stays unmoved, and while being in the tilted up state, the movable panel is being opened until the movable panel transitions into a fully open state. The maximum amount of movement of the driving shoe used to define the fully open state of the movable panel is not limited by the amount of movement of the driving shoe in a reverse direction (to the front of the vehicle) required to bring the movable panel into the tilted up state. As a result, it is possible to increase the maximum amount of movement of the driving shoe used to define the fully open state of the movable panel, that is, the opening area of the movable panel.

In the roof apparatus, it is preferable that the driving shoe includes a first engaging protrusion: the roof apparatus further includes a first check block including a first engaging recessed portion, and provided on the guide rail; a front shoe that is supported by the guide rail in such a way as to be able to move in the longitudinal direction of the vehicle; and a first rotating check which includes a first engaging groove, is turnably connected to the front shoe, and is biased in a turning direction in which the first rotating check is inserted into the first engaging recessed portion, the turning of which is limited, and the movement of the front shoe is limited when the first rotating check is inserted into the first engaging recessed portion in the fully closed state, the turning of which is guided in such a way as to move out of the first engaging recessed portion, and limitation to the movement of the front shoe is released because the first engaging groove is pressed by the first engaging protrusion when the driving shoe moves further to the front of the vehicle in the tilted up state, and which is engaged with the first engaging protrusion in such a way for the front shoe to move integrally with the driving shoe when the driving shoe moves to the rear of the vehicle thereafter: and the front member is turnably connected to the front end portion of the first support bracket, is capable of switching between an allowed state and a limited state in which the movement of the front member in the longitudinal direction of the vehicle along the guide rail is allowed and limited, is a front link that is present in the limited state in the fully closed state, is engaged with the front shoe while switching to the allowed state when the front shoe moves to the rear of the vehicle relative to the front link, and when the front shoe moves to the front of the vehicle relative to the front link, is disengaged from the front shoe while switching to the limited state, and is present in the disengaged state in the fully closed state.

In this configuration, since the front link is present in the limited state, and the movement of the front shoe is limited by the first rotating check in the fully closed state, when the driving shoe moves to the front of the vehicle for the transition of the movable panel into the tilted up state, the movement of the front end portion of the first support bracket is limited. In the tilted up state, the first rotating check, the first engaging groove of which is pressed by the first engaging protrusion when the driving shoe moves further to the front of the vehicle, releases the limitation to the movement of the front shoe. Thereafter, the first rotating check is engaged with the first engaging protrusion such that the front shoe moves integrally with the driving shoe when the driving shoe moves to the rear of the vehicle. Accordingly, since the front shoe moves to the rear of the vehicle relative to the front link, and is engaged with the front link, the front shoe and the front link integrally move to the rear of the vehicle along with the front end portion of the first support bracket. As such, in the tilted up state, even though the front shoe moves to the front of the vehicle along with the driving shoe so as to release the limitation to the movement of the front shoe, the front shoe is not engaged with the front link unless the front shoe moves to the rear of the vehicle relative to the front link. For this reason, it is possible to more reliably limit the movement of the front link and the front end portion of the first support bracket.

It is preferable that the roof apparatus further includes a second check block including a second engaging recessed portion, and provided on the guide rail; a rear shoe that is supported by the guide rail in such a way as to be able to move in the longitudinal direction of the vehicle, and is turnably connected to the front end portion of the second support bracket; and a second rotating check which includes a second engaging groove, is turnably connected to the rear shoe, and is biased in a turning direction in which the second rotating check is inserted into the second engaging recessed portion, and the turning of which is limited, and the movement of the rear shoe is limited when the second rotating check is inserted into the second engaging recessed portion in the fully closed state; and the rear member includes a rear guide member which includes a second engaging protrusion, is supported by the guide rail in such a way as to be able to move in the longitudinal direction of the vehicle by being connected to the second support bracket, whose portion connected to the second support bracket is raised when the rear guide member moves to the front of the vehicle relative to the second support bracket, and which guides the turning of the second rotating check to release the limitation to the movement of the rear shoe by pressing the second engaging groove with the second engaging protrusion when the driving shoe moves further to the front of the vehicle in the tilted up state in such a way that the second rotating check moves out of the second engaging recessed portion, and engages with the second rotating check at the second engaging protrusion in such a way that the driving shoe moves integrally with the rear shoe when the driving shoe moves to the rear of the vehicle thereafter; and a check member which is turnably connected to the rear guide member in such a way that the check member can be engaged with the driving shoe, is engaged with the driving shoe in a case where the predetermined amount is lower than the amount of movement of the driving shoe to the rear of the vehicle when the movable panel transitions from the fully closed state into the tilted up state, and is being opened, and which is disengaged from the driving shoe, and the movement of which is limited in the longitudinal direction of the vehicle when the amount of movement reaches the predetermined amount.

In this configuration, since the movement of the rear shoe is limited by the second rotating check in the fully closed state, when the driving shoe moves to the front of the vehicle along with the rear guide member for the transition of the movable panel into the tilted up state, the movement of the front end portion of the second support bracket is limited. In the tilted up state, the second rotating check, the second engaging groove of which is pressed by the second engaging protrusion when the driving shoe moves further to the front of the vehicle along with the rear guide member, releases the limitation to the movement of the rear shoe. Thereafter, the second rotating check is engaged with the second engaging protrusion such that the rear shoe moves integrally with the driving shoe when the driving shoe moves to the rear of the vehicle along with the rear guide member. Accordingly, the rear shoe integrally with the front end portion of the second support bracket moves to the rear of the vehicle. In the tilted up state, when the rear shoe moves to the front of the vehicle along with the driving shoe and the rear guide member so as to release the limitation to the movement of the rear shoe, the front end portion of the second support bracket also moves to the front of the vehicle. However, the support position of the second support bracket for the first support bracket is moved to the front of the vehicle relative to the first support bracket, and thus it is possible to suppress the movement of the front end portion of the first support bracket.

In the roof apparatus, it is preferable that, when the driving shoe moves to the front of the vehicle so as to close the movable panel from an open state, the front shoe and the first rotating check move to the front of the vehicle relative to the front link while the front link moving to the front of the vehicle along with the front shoe and the first rotating check switches to the limited state, and when the first rotating check reaches the first engaging recessed portion, the first rotating check is inserted into the first engaging recessed portion, and the driving shoe is allowed to move to the rear of the vehicle relative to the front shoe. When the driving shoe moves to the front of the vehicle so as to close the movable panel from an open state, the second rotating check moving to the front of the vehicle along with the check member passes through the second engaging recessed portion at a stage in which the first rotating check reaches the first engaging recessed portion, and when the driving shoe moves to the rear of the vehicle for the transition of the movable panel into the fully closed state, and the second rotating check moving to the rear of the vehicle along with the check member reaches the second engaging recessed portion, and is inserted into the second engaging recessed portion, and the driving shoe is allowed to move to the rear of the vehicle relative to the rear shoe.

In this configuration, when the driving shoe moves to the front of the vehicle so as to close the movable panel from an open state, the front link moving to the front of the vehicle along with the front shoe and the first rotating check switches into the limited state, and thus the movement of the front end portion of the first support bracket is limited. When the front shoe and the first rotating check move to the front of the vehicle relative to the front link, the first rotating check reaches the first engaging recessed portion, and is inserted into the first engaging recessed portion, and the driving shoe is allowed to move to the rear of the vehicle relative to the front shoe. In contrast, when the driving shoe moves to the front of the vehicle so as to close the movable panel from an open state, the second rotating check moving to the front of the vehicle along with the check member passes through the second engaging recessed portion at a stage in which the first rotating check reaches the first engaging recessed portion. When the driving shoe moves to the rear of the vehicle for the transition of the movable panel into the fully closed state, the second rotating check moving to the rear of the vehicle along with the check member reaches the second engaging recessed portion, and is inserted into the second engaging recessed portion, and the driving shoe is allowed to move to the rear of the vehicle relative to the rear shoe. Accordingly, the driving shoe moves to the rear of the vehicle relative to the first support bracket and the second support bracket, and the movable panel transitions into the fully closed state. The movement of the front end portion of the First support bracket is limited, and the front end portion of the second support bracket moves to the rear of the vehicle along with the rear shoe until the second rotating check reaches the second engaging recessed portion after the first rotating check reaches the first engaging recessed portion. However, even though the front end portion of the second support bracket moves to the rear of the vehicle, only the support position of the second support bracket for the first support bracket moves, and thus the movement slightly affects or does not affect the position of the first support bracket, that is, the position of the movable panel. As such, since the second rotating check may be inserted into the second engaging recessed portion while moving to the rear of the vehicle, it is possible to reduce the play of the second rotating check when the second rotating check is inserted into the second engaging recessed portion. Accordingly, it is possible to more accurately set a position in which the second rotating check is inserted into the second engaging recessed portion, that is, a position in which the tilting down of the movable panel for the transition into the fully closed state is started.

In the roof apparatus, it is preferable that the front link is engaged with the front shoe such that the front link turns toward a predetermined engagement position, and the roof apparatus further includes an expediting portion configured to expedite the turning of the front link to the vicinity of the engagement position prior to the engagement between the front link and the front shoe when the front shoe moves to the rear of the vehicle relative to the front link.

In the roof apparatus, it is preferable that the expediting portion includes a link-side guide wall which is provided in the front link in such a way as to protrude to a vehicle interior side, and a shoe-side guide wall which is provided in the front shoe in such a way as to protrude to a vehicle exterior side.

According to the aspects of this disclosure, it is possible to increase the opening area of the movable panel which is being opened while being in the tilted up state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof apparatus comprising:
    a front member and a rear member which are supported by a guide rail in such a way as to be able to move in a longitudinal direction of a vehicle and as to be engaged with a driving shoe driven to move in the longitudinal direction of the vehicle along the guide rail;
    a first support bracket, a front end portion of which is supported by the guide rail and is connected to the front member, and which supports a movable panel; and
    a second support bracket, a front end portion of which is supported by the guide rail, a portion of which is connected to the rear member with the portion being positioned closer to a rear of the vehicle than the front end portion, and which movably supports the first support bracket,
    wherein the driving shoe is engaged with the rear member and is disengaged from the front member when the movable panel is in a fully closed state, thereby when the driving shoe moves to a front of the vehicle along with the rear member, the second support bracket turns in such a way that a portion of the second support bracket connected to the rear member is raised pivotally to the front end portion of the second support bracket, the first support bracket turns in such a way that a portion of the first support bracket supporting the second support bracket is raised pivotally to the front end portion of the first support bracket, and thus, the movable panel transitions into a tilted up state,
    wherein the driving shoe is engaged with the front member when the driving shoe moves to the rear of the vehicle after moving further to the front of the vehicle in the tilted up state, thereby the driving shoe moves along with the front member, and the movable panel is being opened while being in the tilted up state, and wherein when the amount of movement of the driving shoe to the rear of the vehicle exceeds a predetermined amount, the driving shoe is disengaged from the rear member.

2. The roof apparatus according to claim 1,
wherein the driving shoe includes a first engaging protrusion,
wherein the roof apparatus further comprises:
a first check block including a first engaging recessed portion, and provided on the guide rail;
a front shoe that is supported by the guide rail in such a way as to be able to move in the longitudinal direction of the vehicle; and
a first rotating check which includes a first engaging groove, is turnably connected to the front shoe, and is biased in a turning direction in which the first rotating check is inserted into the first engaging recessed portion, the turning of which is limited, and the movement of the front shoe is limited when the first rotating check is inserted into the first engaging recessed portion in the fully closed state, the turning of which is guided in such a way as to move out of the first engaging recessed portion, and limitation to the movement of the front shoe is released because the first engaging groove is pressed by the first engaging protrusion when the driving shoe moves further to the front of the vehicle in the tilted up state, and which is engaged with the first engaging protrusion in such a way for the front shoe to move integrally with the driving shoe when the driving shoe moves to the rear of the vehicle thereafter, and
wherein the front member is turnably connected to the front end portion of the first support bracket, is capable of switching between an allowed state and a limited state in which the movement of the front member in the longitudinal direction of the vehicle along the guide rail is allowed and limited, is a front link that is present in the limited state in the fully closed state, is engaged with the front shoe while switching to the allowed state when the front shoe moves to the rear of the vehicle relative to the front link, and when the front shoe moves to the front of the vehicle relative to the front link, is disengaged from the front shoe while switching to the limited state, and is present in the disengaged state in the fully closed state.

3. The roof apparatus according to claim 2, further comprising:
a second check block including a second engaging recessed portion, and provided on the guide rail;
a rear shoe that is supported by the guide rail in such a way as to be able to move in the longitudinal direction of the vehicle, and is turnably connected to the front end portion of the second support bracket; and
a second rotating check which includes a second engaging groove, is turnably connected to the rear shoe, and is biased in a turning direction in which the second rotating check is inserted into the second engaging recessed portion, and the turning of which is limited, and the movement of the rear shoe is limited when the second rotating check is inserted into the second engaging recessed portion in the fully closed state,
wherein the rear member includes
a rear guide member which includes a second engaging protrusion, is supported by the guide rail in such a way as to be able to move in the longitudinal direction of the vehicle by being connected to the second support bracket, whose portion connected to the second support bracket is raised when the rear guide member moves to the front of the vehicle relative to the second support bracket, and which guides the turning of the second rotating check to release the limitation to the movement of the rear shoe by pressing the second engaging groove with the second engaging protrusion when the driving shoe moves further to the front of the vehicle in the tilted up state in such a way that the second rotating check moves out of the second engaging recessed portion, and engages with the second rotating check at the second engaging protrusion in such a way that the driving shoe moves integrally with the rear shoe when the driving shoe moves to the rear of the vehicle thereafter; and
a check member which is turnably connected to the rear guide member in such a way that the check member can be engaged with the driving shoe, is engaged with the driving shoe in a case where the predetermined amount is lower than the amount of movement of the driving shoe to the rear of the vehicle when the movable panel transitions from the fully closed state into the tilted up state, and is being opened, and which is disengaged from the driving shoe, and the movement of which is limited in the longitudinal direction of the vehicle when the amount of movement reaches the predetermined amount.

4. The roof apparatus according to claim 3,
wherein when the driving shoe moves to the front of the vehicle so as to close the movable panel from an open state, the front shoe and the first rotating check move to the front of the vehicle relative to the front link while the front link moving to the front of the vehicle along with the front shoe and the first rotating check switches to the limited state, and when the first rotating check reaches the first engaging recessed portion, the first rotating check is inserted into the first engaging recessed portion, and the driving shoe is allowed to move to the rear of the vehicle relative to the front shoe, and
wherein when the driving shoe moves to the front of the vehicle so as to close the movable panel from an open state, the second rotating check moving to the front of the vehicle along with the check member passes through the second engaging recessed portion at a stage in which the first rotating check reaches the first engaging recessed portion, and when the driving shoe moves to the rear of the vehicle for the transition of the movable panel into the fully closed state, the second rotating check moving to the rear of the vehicle along with the check member reaches the second engaging recessed portion, and is inserted into the second engaging recessed portion, and the driving shoe is allowed to move to the rear of the vehicle relative to the rear shoe.

5. The roof apparatus according to claim 2,
wherein the front link is engaged with the front shoe such that the front link turns toward a predetermined engagement position, and
wherein the roof apparatus further comprises an expediting portion configured to expedite the turning of the front link to the vicinity of the engagement position prior to the engagement between the front link and the front shoe when the front shoe moves to the rear of the vehicle relative to the front link.

6. The roof apparatus according to claim 5,
wherein the expediting portion includes a link-side guide wall which is provided in the front link in such a way as to protrude to a vehicle interior side, and a shoe-side guide wall which is provided in the front shoe in such a way as to protrude to a vehicle exterior side.

* * * * *